US011962782B2

(12) United States Patent
Francois et al.

(10) Patent No.: US 11,962,782 B2
(45) Date of Patent: Apr. 16, 2024

(54) ENCODING AND DECODING WITH REFINEMENT OF THE RECONSTRUCTED PICTURE

(71) Applicant: InterDigital VC Holdings, Inc., Wilmington, DE (US)

(72) Inventors: Edouard Francois, Cesson-Sevigne (FR); Christophe Chevance, Cesson-Sevigne (FR); Franck Hiron, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/964,117

(22) PCT Filed: Jan. 4, 2019

(86) PCT No.: PCT/US2019/012282
§ 371 (c)(1),
(2) Date: Jul. 22, 2020

(87) PCT Pub. No.: WO2019/147403
PCT Pub. Date: Aug. 1, 2019

(65) Prior Publication Data
US 2021/0037247 A1    Feb. 4, 2021

(30) Foreign Application Priority Data

Jan. 29, 2018 (EP) .................................... 18305080
Mar. 22, 2018 (EP) .................................... 18305315
Mar. 30, 2018 (EP) .................................... 18305386

(51) Int. Cl.
*H04N 19/85* (2014.01)
*H04N 19/147* (2014.01)
(Continued)

(52) U.S. Cl.
CPC ......... *H04N 19/147* (2014.11); *H04N 19/176* (2014.11); *H04N 19/186* (2014.11);
(Continued)

(58) Field of Classification Search
CPC .. H04N 19/105; H04N 19/147; H04N 19/176; H04N 19/186; H04N 19/463; H04N 19/82; H04N 19/85; H04N 19/90
See application file for complete search history.

(56) References Cited

U.S. PATENT DOCUMENTS 6,212,235 B1    4/2001  Nieweglowski et al.
8,208,564 B2    6/2012  Bossen et al.
(Continued)

FOREIGN PATENT DOCUMENTS

CN    101208957 A    6/2008
CN    103392338 A    11/2013
(Continued)

OTHER PUBLICATIONS

Anonymous: "Joint Scalable Video Model JSVM-12", 25, MPEG Meeting; Oct. 21, 2007-Oct. 26, 2007.
(Continued)

*Primary Examiner* — Md N Haque
(74) *Attorney, Agent, or Firm* — CONDO ROCCIA KOPTIW LLP

(57) ABSTRACT

An encoding method for a picture part encoded in a bitstream and reconstructed can involve refinement data encoded in the bitstream and determined based on at least one comparison of a version of a rate distortion cost computed using a data coding cost, a distortion between an original version of the picture part and a reconstructed picture part, and at least one other version involving one or more combinations of with or without a refinement by the refinement data, or a refinement either in or out of the
(Continued)

decoding loop, or with or without a mapping or an inverse mapping.

18 Claims, 11 Drawing Sheets

(51) Int. Cl.
  *H04N 19/176* (2014.01)
  *H04N 19/186* (2014.01)
  *H04N 19/463* (2014.01)
  *H04N 19/82* (2014.01)

(52) U.S. Cl.
  CPC .......... *H04N 19/463* (2014.11); *H04N 19/82* (2014.11); *H04N 19/85* (2014.11)

(56) References Cited

U.S. PATENT DOCUMENTS

| | | | |
|---|---|---|---|
| 8,934,542 | B2 | 1/2015 | Wiegand et al. |
| 9,807,424 | B2 | 10/2017 | Guo et al. |
| 9,877,019 | B2 | 1/2018 | Chen et al. |
| 9,883,203 | B2 | 1/2018 | Chien et al. |
| 10,397,616 | B2 | 8/2019 | Dong et al. |
| 10,448,010 | B2 | 10/2019 | Chen et al. |
| 10,462,462 | B2 | 10/2019 | Chien et al. |
| 10,798,403 | B2 | 10/2020 | Ikai et al. |
| 10,848,785 | B2 | 11/2020 | Sadafale et al. |
| 10,972,728 | B2 | 4/2021 | He et al. |
| 10,999,594 | B2 | 5/2021 | Hsieh et al. |
| 2006/0256866 | A1 | 11/2006 | Ziauddin et al. |
| 2008/0002767 | A1* | 1/2008 | Schwarz ............ H04N 19/147 375/240.12 |
| 2010/0260260 | A1* | 10/2010 | Wiegand ................ H04N 19/61 375/240.12 |
| 2012/0287994 | A1 | 11/2012 | Van Der Auwera et al. |
| 2012/0328013 | A1* | 12/2012 | Budagavi ............ H04N 19/186 375/240.12 |
| 2013/0044804 | A1 | 2/2013 | Nilsson et al. |
| 2013/0177066 | A1* | 7/2013 | Ye ........................ H04N 19/182 375/240.02 |
| 2013/0215959 | A1 | 8/2013 | Chen et al. |
| 2013/0259118 | A1 | 10/2013 | Fu et al. |
| 2014/0254661 | A1 | 9/2014 | Saxena et al. |
| 2014/0355675 | A1* | 12/2014 | He ........................ H04N 19/82 375/240.12 |
| 2015/0229926 | A1 | 8/2015 | Puri |
| 2016/0080745 | A1 | 3/2016 | Kwak et al. |
| 2016/0119650 | A1 | 4/2016 | Sadafale et al. |
| 2016/0156938 | A1 | 6/2016 | Fu et al. |
| 2016/0234492 | A1 | 8/2016 | Li et al. |
| 2017/0006284 | A1 | 1/2017 | Gokhale et al. |
| 2017/0064302 | A1 | 3/2017 | Na et al. |
| 2017/0127059 | A1 | 5/2017 | Kim et al. |
| 2017/0208336 | A1 | 7/2017 | Li et al. |
| 2018/0020218 | A1 | 1/2018 | Zhao et al. |
| 2018/0048901 | A1 | 2/2018 | Zhang et al. |
| 2018/0063523 | A1* | 3/2018 | Marpe .................... H04N 19/50 |
| 2018/0098063 | A1 | 4/2018 | Chen et al. |
| 2018/0192069 | A1 | 7/2018 | Chen et al. |
| 2018/0220138 | A1 | 8/2018 | He et al. |
| 2019/0037231 | A1 | 1/2019 | Ikai et al. |
| 2019/0075328 | A1 | 3/2019 | Huang et al. |
| 2019/0082191 | A1 | 3/2019 | Chuang et al. |
| 2019/0191171 | A1 | 6/2019 | Ikai |
| 2019/0320171 | A1 | 10/2019 | Zhang et al. |
| 2019/0320199 | A1* | 10/2019 | Chen ...................... H04N 19/57 |
| 2019/0342547 | A1 | 11/2019 | Lee et al. |
| 2020/0145698 | A1 | 5/2020 | Gao et al. |
| 2020/0204819 | A1 | 6/2020 | Hsieh et al. |
| 2020/0236359 | A1 | 7/2020 | Gao et al. |
| 2022/0132103 | A1 | 4/2022 | Li et al. |

FOREIGN PATENT DOCUMENTS

| | | | |
|---|---|---|---|
| CN | 103733621 A | 4/2014 | |
| CN | 105872559 A | 8/2016 | |
| CN | 107360434 A | 11/2017 | |
| DE | 69623342 T2 | 10/2002 | |
| EP | 2143279 A1 | 1/2010 | |
| EP | 2143279 B1 * | 10/2010 | ............ H04N 19/30 |
| EP | 1528812 B1 | 7/2013 | |
| EP | 2816805 A1 | 12/2014 | |
| EP | 2988503 A1 | 2/2016 | |
| RU | 2577486 C2 | 3/2016 | |
| WO | 2009/000110 A1 | 12/2008 | |
| WO | 2010/123862 A1 | 10/2010 | |
| WO | 2012/172113 A1 | 12/2012 | |
| WO | 2016123068 A1 | 8/2016 | |
| WO | 2017/008678 A1 | 1/2017 | |
| WO | 2017195554 A1 | 11/2017 | |
| WO | 2018065250 A1 | 4/2018 | |
| WO | 2019072367 A1 | 4/2019 | |

OTHER PUBLICATIONS

Shay Har-Noy et al., "Adaptive In-Loop Prediction Refinement for Video Coding", Multimedia Signal Processing, 2007, IEEE 9th Workshop, Oct. 1, 2007, pp. 171-174.
Ahmadianpour et al., "Novel Techniques for Reducing Blocking Artifacts in Motion Compensated Frame", Journal of Electronic Imaging, vol. 15, No. 1, Jan.-Mar. 2006, 013007-1-013007-8.
Chen et al., "Algorithm Description of Joint Exploration Test Model 2", JVET-B1001 V3, Editors, Joint Video Exploration Team (JVET) of ITU-T SG16 \I\IP3 and ISO/IEC JTC1/SC29/WG11, 2nd Meeting, San Diego, California, USA, Feb. 20-26, 2016, 32 pages.
Chen et al., "Algorithm Description of Joint Exploration Test Model 5 (JEM 5)", JVET-E1001-V2, Editors, Joint Video Exploration Team (JVET) of ITU-T SG 16 WP 3 and ISO/IEC JTC 1/SC 29/WG 11, 5th Meeting: Geneva, CH, Jan. 12-20, 2017, 45 pages.
Chen et al., "Algorithm Description of Joint Exploration Test Model 6 (JEM 6)", JVET-F1001-V2, Editors, Joint Video Exploration Team (JVET) of ITU-T SG 16 WP 3 and ISO/IEC JTC 1/SC 29/WG 11, Hobart, AU, Mar. 31-Apr. 7, 2017, 49 pages.
Chen et al., "Algorithm Description of Joint Exploration Test Model 7 (JEM 7)", JVET-G1001-V1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.
Chen et al., "Variable Block-Size Overlapped Block Motion Compensation in the Next Generation Open-source Video Codec", IEEE, Sep. 17, 2017, pp. 938-942.
Cho et al., "Fast CU Splitting and Pruning for Suboptimal CU Partitioning in HEVC Intra Coding", IEEE Transactions on Circuits and Systems for Video Technology, vol. 23, No. 9, Sep. 2013, pp. 1555-1564.
Fu et al., "Sample Adaptive Offset for Hevc", IEEE 13th International Workshop on Multimedia Signal Processing, Hangzhou, 2011, 5 pages.
Grecos, Christos, "Beyond the High Efficiency Video Coding Standard: An Overview", Proceedings of SPIE, May 1, 2017, 19 pages.
Guo et al., "Gradient Based Fast CU Splitting and Mode Decision Algorithm for HEVC Intra Prediction", IEEE 2014 International Conference on Anti-Counterfeiting, Security and Identification, Dec. 12, 2014, 5 pages.
Huang et al., "Affine Skip and Direct Modes for Efficient Video Coding", Visual Communications and Image Processing (VCIP), IEEE, Nov. 27, 2012, 6 pages.
ISO/IEC, "Algorithm Description of Joint Exploration Test Model 7 (JEM7)", ISO/IEC JTC1/SC29/WG11 N17055, Oct. 2017.
ITU-T, "High Efficiency Video Coding", Recommendation ITU-T H.265, Series H: Audiovisual and Multimedia Systems, Infrastructure of Audiovisual Services—Coding of Moving Video, Oct. 2014, 540 pages.
ITU-T, "High Efficiency Video Coding", Recommendation ITU-T H.265, Series H: Audiovisual and Multimedia Systems, Infrastructure of Audiovisual Services—Coding of Moving Video, Apr. 2015, pp. 1-634.

(56) References Cited

OTHER PUBLICATIONS

Li et al., "Multi-Type-Tree", JVET-D0117, Qualcomm Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-3.

Li et al., "Non CE4: Fine Granularity QP Offset", JCTVC-G850, MediaTek Inc., Qualcomm Inc., Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-9.

Lin et al., "Affine Transform Prediction for Next Generation Video Coding", COM 16-C1016, ITU Study Group 16, Sep. 2015.

Reznik, Yuriy A., "Relationship Between DCT-II, DCT-VI, and DST-VII Transforms", IEEE, May 26-31, 2013, pp. 5642-5646.

Wang et al., "Image Quality Assessment: From Error Visibility to Structural Similarity", IEEE Transactions on Image Processing, vol. 13, No. 4, Apr. 2004, pp. 600-612.

Wei et al., "Modified Winner Update with Adaptive Block Partition for Fast Motion Estimation", 2006 IEEE International Conference on Multimedia and Expo (ICME 2006), Ontario, Canada, Jul. 9, 2006, pp. 133-136.

Wen et al., "Non-CE9 Parallel Merge/Skip Mode for Hevc", ISO/IEC JTC1/SC29/WG11 m21949, Geneva, Switzerland, Nov. 2011.

Xu et al., "Chroma QP Extension and Signalling Enhancement", JCTVC-I0265r1, Sony Electronics Inc., Magnum Semiconductor Inc., Sony Corp., Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, pp. 1-11.

Zhou et al., "New Rate-Complexity-Quantization Modeling and Efficient Rate Control for H.264/AVC", IEEE, Jun. 23, 2008, pp. 717-720.

Bordes et al., "Description of SDR, HDR and 360° Video Coding Technology Proposal by Qualcomm and Technicolor—Medium Complexity Version", JVET-J0022R1, Qualcomm, Technicolor, Joint Video Experts Team (JVET) of ITU-T SG 16 WP 3 and ISO/IEC JTC 1/SC 29/WG 11, 10th Meeting: San Diego, US, Apr. 10-20, 2018, 83 pages.

Francois et al., "CE12-Related: In-Loop Chroma Refinement", JVET-K0468, Technicolor, Joint Video Experts Team (JVET) of ITU-T SG 16 WP 3 and ISO/IEC JTC 1/SC 29/WG 11, 11th Meeting: Ljubljana, SI, Jul. 10- 18, 2018, pp. 1-3.

Minoo et al., "Description of the Reshaper Parameters Derivation Process in ETM Reference Software", JCTVC-W0031, Aris, Dolby, InterDigital, Qualcomm, Technicolor, Joint Collaborative Team on Video Coding (JCT-VC) of ITU-T SG WP 3 and ISO/IEC JTC 1/SC 29/WG 11, 23rd Meeting: San Diego, USA, Feb. 19-26, 2016, pp. 1-17.

Sun et al., "Rate-Distortion Modelling and Its Application to Quality Layer Assignment In SVC/H.264 Fine-Granular SNR Scalable Videos", Computer Science, 2007, 4 pages.

Chen, et al., "Algorithm Description of Joint Exploration Test Model 6 (JEM 6)", JVET-F1001-V3, Editors, Joint Video Exploration Team (JVET) of ITU-T SG 16 WP3 and ISO/IEC JTC 1/SC 29/WG 11, 6th Meeting: Hobart, AU, Mar. 31-Apr. 7, 2017, 48 pages.

Park, et al., "Context-Based Ternary Tree Decision Method in Versatile Video Coding for Fast Intra Coding", IEEE Access vol. 7, 2019, Nov. 27, 2019, 9 pages.

Suehring, et al., "JVET Common Test Conditions and Software Reference Configurations", JVET-B1010, Joint Video Exploration Team (JVET) of ITU-T SG16 WP3 and ISOJIEC JTC 1/SC291WG 11, 2nd Meeting, San Diego, California, USA, Feb. 20, 2016, 4 pages.

\* cited by examiner

ENCODING AND DECODING WITH REFINEMENT OF THE RECONSTRUCTED PICTURE

CROSS-REFERENCE TO RELATED APPLICATIONS

This application is the national stage entry under 35 U.S.C. § 371 of International Application PCT/US2019/012282, filed Jan. 4, 2019, which was published in accordance with PCT Article 21(2) on Jan. 8, 2019, in English, and which claims the benefit of European Patent Application No. 18305080.6, filed Jan. 29, 2018, European Patent Application No. 18305315.6, filed Mar. 22, 2018, and European Patent Application No. 18305386.7, filed Mar. 30, 2018, the disclosures of each of which are incorporated by reference herein in their entireties.

1. TECHNICAL FIELD

The present embodiments generally relate to a method and a device for picture encoding and decoding, and more particularly, to a method and a device for encoding and decoding a picture part.

2. BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original picture block and the predicted picture block, often denoted as prediction errors or prediction residuals, are transformed, quantized and entropy coded. To reconstruct the video, the compressed data is decoded by inverse processes corresponding to the prediction, transform, quantization and entropy coding.

Distortions are often observed in the reconstructed video signal, especially in the case where the video signal is mapped before being encoding, e.g. to better exploit sample codewords distribution of the video pictures.

3. BRIEF SUMMARY

An encoding method is disclosed that comprises:
encoding a picture part in a bitstream and reconstructing the picture part;
determining refinement data such that:
  a rate distortion cost computed as a weighted sum of data coding cost and of a distortion between an original version of the picture part and the reconstructed picture part after refinement by the refinement data is decreased compared to a rate distortion cost computed as a weighted sum of data coding cost and of a distortion between the original version of the picture part and the reconstructed picture part without refinement in the case where no mapping applies before coding;
  a rate distortion cost computed as a weighted sum of data coding cost and of a distortion between an original version of the picture part and the reconstructed picture part after inverse mapping and refinement by the refinement data is decreased compared to a rate distortion cost computed as a weighted sum of data coding cost and of a distortion between the original version of the picture part and the reconstructed picture part after inverse mapping without refinement in the case where mapping applies before coding and the refinement is out of the decoding loop;
  a rate distortion cost computed as a weighted sum of data coding cost and of a distortion between a mapped original version of the picture part and the reconstructed picture part after refinement by the refinement data is decreased compared to a rate distortion cost computed as a weighted sum of data coding cost and of a distortion between the mapped original version of the picture part and the reconstructed picture part without refinement in the case where mapping applies before coding and the refinement is in the decoding loop; and
encoding the refinement data in the bitstream.

An encoding device is disclosed that comprises:
means for encoding a picture part in a bitstream and for reconstructing the picture part;
means for determining refinement data such that:
  a rate distortion cost computed as a weighted sum of data coding cost and of a distortion between an original version of the picture part and the reconstructed picture part after refinement by the refinement data is decreased compared to a rate distortion cost computed as a weighted sum of data coding cost and of a distortion between the original version of the picture part and the reconstructed picture part without refinement in the case where no mapping applies before coding;
  a rate distortion cost computed as a weighted sum of data coding cost and of a distortion between an original version of the picture part and the reconstructed picture part after inverse mapping and refinement by the refinement data is decreased compared to a rate distortion cost computed as a weighted sum of data coding cost and of a distortion between the original version of the picture part and the reconstructed picture part after inverse mapping without refinement in the case where mapping applies before coding and the refinement is out of the decoding loop;
  a rate distortion cost computed as a weighted sum of data coding cost and of a distortion between a mapped original version of the picture part and the reconstructed picture part after refinement by the refinement data is decreased compared to a rate distortion cost computed as a weighted sum of data coding cost and of a distortion between the mapped original version of the picture part and the reconstructed picture part without refinement in the case where mapping applies before coding and the refinement is in the decoding loop; and
means for encoding the refinement data in the bitstream.

An encoding device is disclosed that comprises a communication interface configured to access at least a picture part and at least one processor configured to:
encode the accessed picture part in a bitstream and reconstruct the picture part;
determine refinement data such that:
  a rate distortion cost computed as a weighted sum of data coding cost and of a distortion between an original version of the picture part and the reconstructed picture part after refinement by the refinement data is decreased compared to a rate distortion cost computed as a weighted sum of data coding cost and of a distortion between the original version of the picture part and the reconstructed picture part without refinement in the case where no mapping applies before coding;

a rate distortion cost computed as a weighted sum of data coding cost and of a distortion between an original version of the picture part and the reconstructed picture part after inverse mapping and refinement by the refinement data is decreased compared to a rate distortion cost computed as a weighted sum of data coding cost and of a distortion between the original version of the picture part and the reconstructed picture part after inverse mapping without refinement in the case where mapping applies before coding and the refinement is out of the decoding loop;

a rate distortion cost computed as a weighted sum of data coding cost and of a distortion between a mapped original version of the picture part and the reconstructed picture part after refinement by the refinement data is decreased compared to a rate distortion cost computed as a weighted sum of data coding cost and of a distortion between the mapped original version of the picture part and the reconstructed picture part without refinement in the case where mapping applies before coding and the refinement is in the decoding loop; and encode the refinement data in the bitstream.

A machine readable medium is disclosed that has stored thereon machine executable instructions that, when executed, implement a method for encoding a picture part, the method comprising:

encoding a picture part in a bitstream and reconstructing the picture part;

determining refinement data such that:

a rate distortion cost between an original version of the picture part and the reconstructed picture part after refinement by the refinement data is decreased compared to a rate distortion cost between the original version of the picture part and the reconstructed picture part without refinement in the case where no mapping applies before coding;

a rate distortion cost between an original version of the picture part and the reconstructed picture part after inverse mapping and refinement by the refinement data is decreased compared to a rate distortion cost between the original version of the picture part and the reconstructed picture part after inverse mapping without refinement in the case where mapping applies before coding and the refinement is out of the decoding loop;

a rate distortion cost between a mapped original version of the picture part and the reconstructed picture part after refinement by the refinement data is decreased compared to a rate distortion cost between the mapped original version of the picture part and the reconstructed picture part without refinement in the case where mapping applies before coding and the refinement is in the decoding loop; and encoding the refinement data in the bitstream.

A computer program or a medium storing such a computer program is disclosed, wherein the computer program comprises software code instructions for performing the encoding method when the computer program is executed by a processor.

A stream is disclosed that comprises encoded data representative of a picture part and refinement data determined such that a rate distortion cost between an original version of the picture part and a decoded version of the picture part is decreased.

a rate distortion cost between an original version of the picture part and the reconstructed picture part after refinement by the refinement data is decreased compared to a rate distortion cost between the original version of the picture part and the reconstructed picture part without refinement in the case where no mapping applies before coding;

a rate distortion cost between an original version of the picture part and the reconstructed picture part after inverse mapping and refinement by the refinement data is decreased compared to a rate distortion cost between the original version of the picture part and the reconstructed picture part after inverse mapping without refinement in the case where mapping applies before coding and the refinement is out of the decoding loop;

a rate distortion cost between a mapped original version of the picture part and the reconstructed picture part after refinement by the refinement data is decreased compared to a rate distortion cost between the mapped original version of the picture part and the reconstructed picture part without refinement in the case where mapping applies before coding and the refinement is in the decoding loop.

In one embodiment, the method further comprises refining the reconstructed picture part with the determined refinement data before storing the refined picture part in a reference picture buffer.

In one embodiment, refining the reconstructed picture part with the refinement data is performed for one component of the picture part independently of any other component of the picture part.

In one embodiment, refining the reconstructed picture part with the refinement data for one component of the picture part depends on another component of the picture part.

In one embodiment, encoding the refinement data in the bitstream comprises encoding for at least one component N refinement values, N being an integer, the N refinement values defining pivot points of a piecewise-linear function.

In one embodiment, the reconstructed picture part is the reconstructed picture part obtained after in-loop filtering or after partial in-loop filtering.

A decoding method is disclosed that comprises:

decoding a picture part and refinement data from a bitstream, the refinement data being defined such that:

a rate distortion cost computed as a weighted sum of data coding cost and of a distortion between an original version of the picture part and the decoded picture part after refinement by the refinement data is decreased compared to a rate distortion cost computed as a weighted sum of data coding cost and of a distortion between the original version of the picture part and the decoded picture part without refinement in the case where no mapping applies before coding;

a rate distortion cost computed as a weighted sum of data coding cost and of a distortion between an original version of the picture part and the decoded picture part after inverse mapping and refinement by the refinement data is decreased compared to a rate distortion cost computed as a weighted sum of data coding cost and of a distortion between the original version of the picture part and the decoded picture part after inverse mapping without refinement in the case where mapping applies before coding and the refinement is out of the decoding loop;

a rate distortion cost computed as a weighted sum of data coding cost and of a distortion between a mapped original version of the picture part and the decoded picture part after refinement by the refinement data is decreased compared to a rate distortion cost computed as a weighted sum of data coding cost and of a distortion between the mapped original version of the picture part and the decoded picture part without refinement in the case where mapping applies before coding and the refinement is in the decoding loop; and refining the decoded picture part with the decoded refinement data.

A decoding device is disclosed that comprises:

means for decoding a picture part and refinement data from a bitstream, the refinement data being defined such that:

a rate distortion cost computed as a weighted sum of data coding cost and of a distortion between an original version of the picture part and the decoded picture part after refinement by the refinement data is decreased compared to a rate distortion cost computed as a weighted sum of data coding cost and of a distortion between the original version of the picture part and the decoded picture part without refinement in the case where no mapping applies before coding;

a rate distortion cost computed as a weighted sum of data coding cost and of a distortion between an original version of the picture part and the decoded picture part after inverse mapping and refinement by the refinement data is decreased compared to a rate distortion cost computed as a weighted sum of data coding cost and of a distortion between the original version of the picture part and the decoded picture part after inverse mapping without refinement in the case where mapping applies before coding and the refinement is out of the decoding loop;

a rate distortion cost computed as a weighted sum of data coding cost and of a distortion between a mapped original version of the picture part and the decoded picture part after refinement by the refinement data is decreased compared to a rate distortion cost computed as a weighted sum of data coding cost and of a distortion between the mapped original version of the picture part and the decoded picture part without refinement in the case where mapping applies before coding and the refinement is in the decoding loop; and means for refining the decoded picture part with the decoded refinement data.

A decoding device comprising a communication interface configured to access at least a stream and at least one processor configured to:

decode a picture part and refinement data from the accessed bitstream, the refinement data being defined such that:

a rate distortion cost computed as a weighted sum of data coding cost and of a distortion between an original version of the picture part and the decoded picture part after refinement by the refinement data is decreased compared to a rate distortion cost computed as a weighted sum of data coding cost and of a distortion between the original version of the picture part and the decoded picture part without refinement in the case where no mapping applies before coding;

a rate distortion cost computed as a weighted sum of data coding cost and of a distortion between an original version of the picture part and the decoded picture part after inverse mapping and refinement by the refinement data is decreased compared to a rate distortion cost computed as a weighted sum of data coding cost and of a distortion between the original version of the picture part and the decoded picture part after inverse mapping without refinement in the case where mapping applies before coding and the refinement is out of the decoding loop;

a rate distortion cost computed as a weighted sum of data coding cost and of a distortion between a mapped original version of the picture part and the decoded picture part after refinement by the refinement data is decreased compared to a rate distortion cost computed as a weighted sum of data coding cost and of a distortion between the mapped original version of the picture part and the decoded picture part without refinement in the case where mapping applies before coding and the refinement is in the decoding loop; and refine the decoded picture part with the decoded refinement data.

A machine readable medium is disclosed that has stored thereon machine executable instructions that, when executed, implement a method for decoding a picture part, the method comprising:

decoding a picture part and refinement data from a bitstream, the refinement data being defined such that:

a rate distortion cost between an original version of the picture part and the decoded picture part after refinement by the refinement data is decreased compared to a rate distortion cost between the original version of the picture part and the decoded picture part without refinement in the case where no mapping applies before coding;

a rate distortion cost between an original version of the picture part and the decoded picture part after inverse mapping and refinement by the refinement data is decreased compared to a rate distortion cost between the original version of the picture part and the decoded picture part after inverse mapping without refinement in the case where mapping applies before coding and the refinement is out of the decoding loop;

a rate distortion cost between a mapped original version of the picture part and the decoded picture part after refinement by the refinement data is decreased compared to a rate distortion cost between the mapped original version of the picture part and the decoded picture part without refinement in the case where mapping applies before coding and the refinement is in the decoding loop; and refining the decoded picture part with the decoded refinement data.

A computer program or a medium storing such a computer program is disclosed, wherein the computer program comprises software code instructions for performing the encoding method when the computer program is executed by a processor.

In one embodiment, the decoding method further comprises inverse mapping the decoded picture part and refining is applied on the decoded picture part after inverse mapping.

In one embodiment, refining the decoded picture part with the refinement data is done before storing the refined decoded picture part in a reference picture buffer.

In one embodiment, refining the decoded picture part with the refinement data is performed for one component of the picture part independently of any other component of the picture part.

In one embodiment, refining the decoded picture part with the refinement data for one component of the picture part depends on another component of the picture part.

In one embodiment, decoding the refinement data from the bitstream comprises decoding for at least one component, N refinement values, N being an integer, the N refinement values defining pivot points of a piecewise-linear function.

In one embodiment, the decoded picture part is the decoded picture part obtained after in-loop filtering or after partial in-loop filtering.

4. BRIEF SUMMARY OF THE DRAWINGS

5. DETAILED DESCRIPTION

Figure 1:
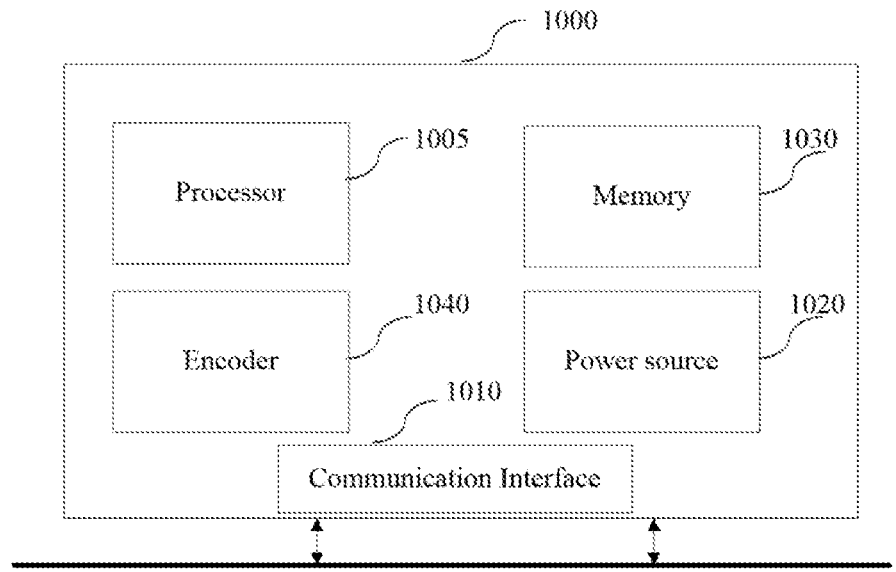
FIG. 1 represents an exemplary architecture of a transmitter 1000 configured to encode a picture in a bitstream according to a specific and non-limiting embodiment.

It is to be understood that the figures and descriptions have been simplified to illustrate elements that are relevant for a clear understanding of the present embodiments, while eliminating, for purposes of clarity, many other elements found in typical encoding and/or decoding devices.

Various methods are described below, and each of the methods comprises one or more steps or actions for achieving the described method. Unless a specific order of steps or actions is required for proper operation of the method, the order and/or use of specific steps and/or actions may be modified or combined.

Reference to "one embodiment" or "an embodiment" of the present principles, as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

It will be understood that, although the terms first and second may be used herein to describe various elements, these elements should not be limited by these terms. These terms are only used to distinguish one element from another.

It is to be appreciated that the use of any of the following "/", "and/or", "at least one of", and "one or more of A, B and C", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

A picture is an array of luma samples in monochrome format or an array of luma samples and two corresponding arrays of chroma samples (or three arrays of tri-chromatic color samples such as RGB) in 4:2:0, 4:2:2, and 4:4:4 colour format. Generally, a "block" addresses a specific area in a sample array (e.g., luma Y), and a "unit" includes the collocated block of all color components (luma Y and possibly chroma Cb and chroma Cr). A slice is an integer number of basic coding units such as HEVC coding tree units or H.264 macroblock units. A slice may consist of a complete picture as well as part thereof. Each slice may include one or more slice segments.

In the following, the word "reconstructed" and "decoded" can be used interchangeably. Usually but not necessarily "reconstructed" is used on the encoder side while "decoded" is used on the decoder side. It should be noted that the term "decoded" or "reconstructed" may mean that a bitstream is partially "decoded" or "reconstructed," for example, the signals obtained after deblocking filtering but before SAO filtering, and the reconstructed samples may be different from the final decoded output that is used for display. We may also use the terms "image," "picture," and "frame" interchangeably.

Various embodiments are described with respect to the HEVC standard. However, the present embodiments are not limited to HEVC, and can be applied to other standards, recommendations, and extensions thereof, including for example HEVC or HEVC extensions like Format Range (RExt), Scalability (SHVC), Multi-View (MV-HEVC) Extensions and future video coding standards, e.g. those developed by Joint Video Experts Team (JVET). The various embodiments are described with respect to the encoding/decoding of a picture part. They may be applied to encode/decode a whole picture or a whole sequence of pictures.

FIG. 1 represents an exemplary architecture of a transmitter 1000 configured to encode a picture in a bitstream according to a specific and non-limiting embodiment.

The transmitter 1000 comprises one or more processor(s) 1005, which could comprise, for example, a CPU, a GPU and/or a DSP (English acronym of Digital Signal Processor), along with internal memory 1030 (e.g. RAM, ROM, and/or EPROM). The transmitter 1000 comprises one or more communication interface(s) 1010 (e.g. a keyboard, a mouse, a touchpad, a webcam), each adapted to display output information and/or allow a user to enter commands and/or data; and a power source 1020 which may be external to the transmitter 1000. The transmitter 1000 may also comprise one or more network interface(s) (not shown). Encoder module 1040 represents the module that may be included in a device to perform the coding functions. Additionally, encoder module 1040 may be implemented as a separate element of the transmitter 1000 or may be incorporated within processor(s) 1005 as a combination of hardware and software as known to those skilled in the art.

The picture may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- a picture capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network. According to an exemplary and non-limiting embodiment, the transmitter 1000 further comprises a computer program stored in the memory 1030. The computer program comprises instructions which, when executed by the transmitter 1000, in particular by the processor 1005, enable the transmitter 1000 to execute the encoding method described with reference to FIG. 5. According to a variant, the computer program is stored externally to the transmitter 1000 on a non-transitory digital data support, e.g. on an external storage medium such as a HDD, CD-ROM, DVD, a read-only and/or DVD drive and/or a DVD Read/Write drive, all known in the art. The transmitter 1000 thus comprises a mechanism to read the computer program. Further, the transmitter 1000 could access one or more Universal Serial Bus (USB)-type storage devices (e.g., "memory sticks.") through corresponding USB ports (not shown).

According to exemplary and non-limiting embodiments, the transmitter 1000 can be, but is not limited to:
- a mobile device;
- a communication device;
- a game device;
- a tablet (or tablet computer);
- a laptop;
- a still picture camera;
- a video camera;
- an encoding chip or encoding device/apparatus;
- a still picture server; and
- a video server (e.g. a broadcast server, a video-on-demand server or a web server).

Figure 2:
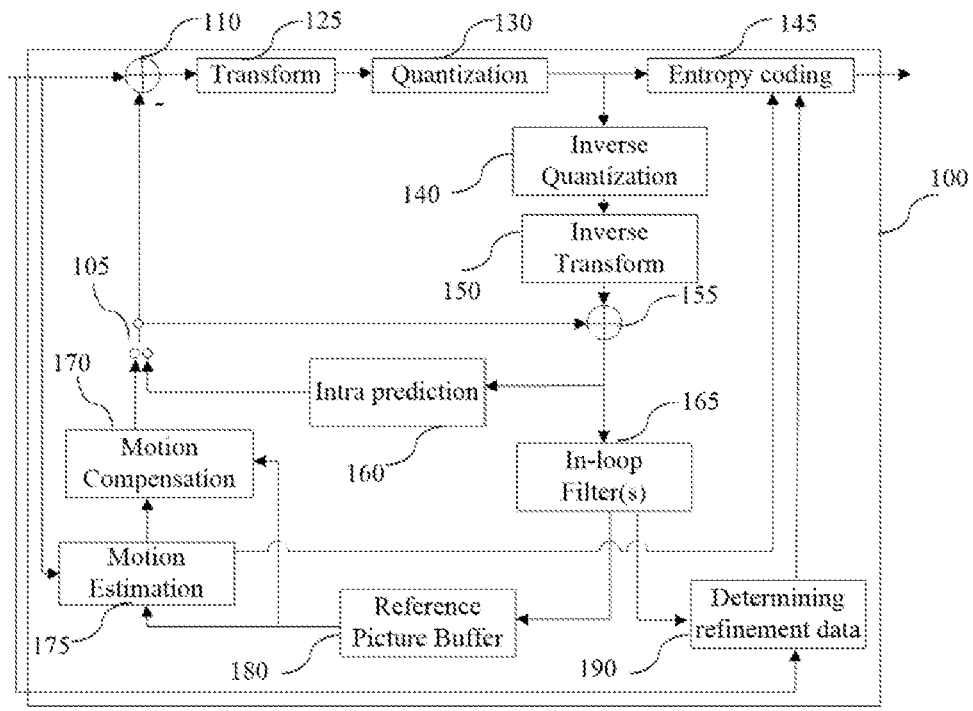
FIG. 2 illustrates an exemplary video encoder, e.g. an encoder of HEVC type, adapted to execute the encoding method.
Figure 5:
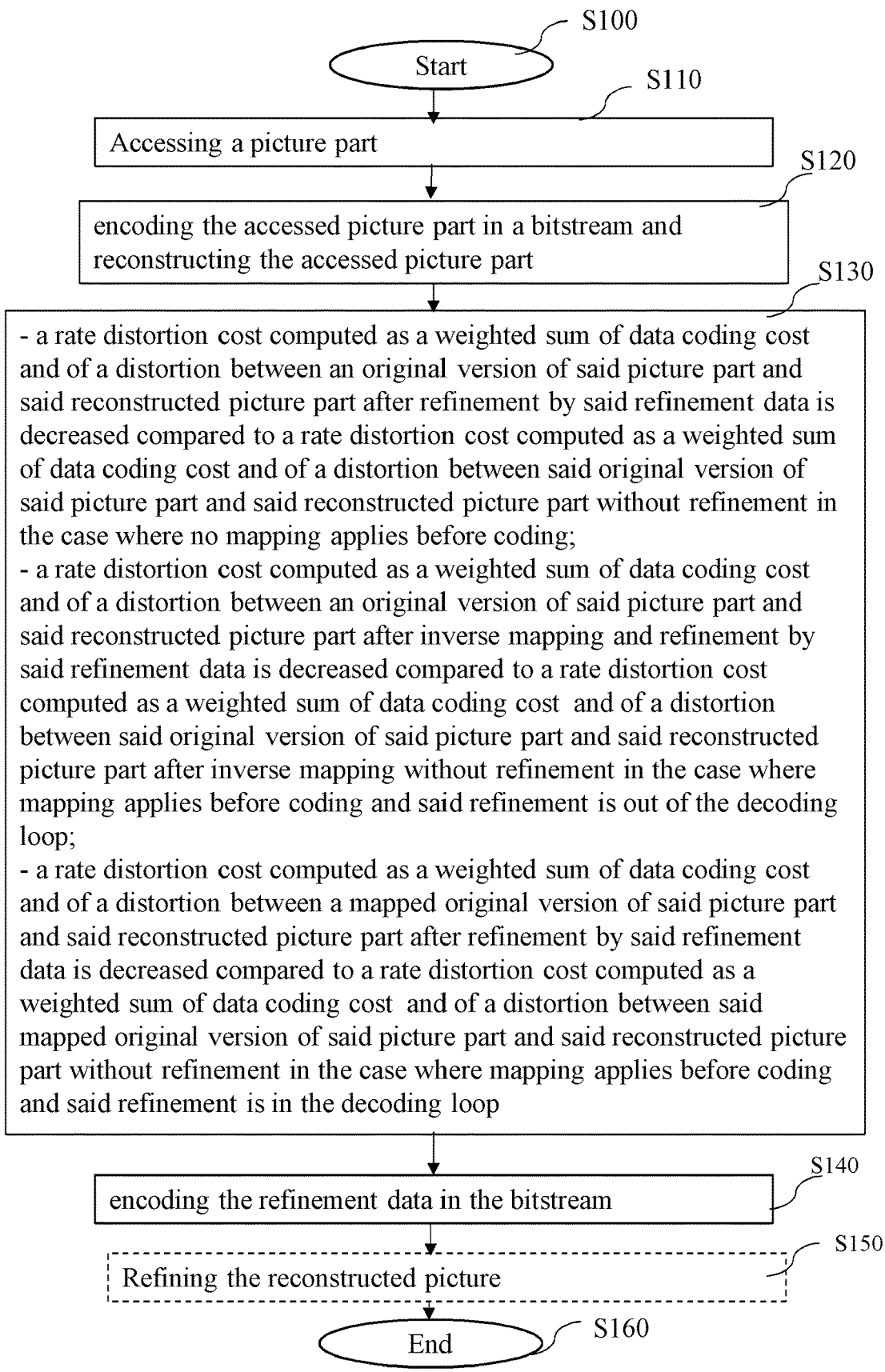
FIG. 5 represents a flowchart of a method for encoding a picture part in a bitstream according to a specific and non-limiting embodiment.

FIG. 2 illustrates an exemplary video encoder 100, e.g. an encoder of HEVC type, adapted to execute the encoding method of FIG. 5. The encoder 100 is an example of a transmitter 1000 or part of such a transmitter 1000.

For coding, a picture is usually partitioned into basic coding units, e.g. into coding tree units (CTU) in HEVC or into macroblock units in H.264. A set of possibly consecutive basic coding units is grouped into a slice. A basic coding unit contains the basic coding blocks of all color components. In HEVC, the smallest coding tree block (CTB) size 16×16 corresponds to a macroblock size as used in previous video coding standards. It will be understood that, although the terms CTU and CTB are used herein to describe encoding/decoding methods and encoding/decoding apparatus, these methods and apparatus should not be limited by these specific terms that may be worded differently (e.g. macroblock) in other standards such as H.264.

In HEVC coding, a picture is partitioned into CTUs of square shape with a configurable size typically 64×64, 128×128, or 256×256. A CTU is the root of a quad-tree partitioning into 4 square Coding Units (CU) of equal size, i.e. half of the parent block size in width and in height. A quad-tree is a tree in which a parent node can be split into four child nodes, each of which may become parent node for another split into four child nodes. In HEVC, a coding Block (CB) is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU.

In more recent encoding systems, a CTU is the root of a coding tree partitioning into Coding Units (CU). A coding tree is a tree in which a parent node (usually corresponding to a CU) can be split into child nodes (e.g. into 2, 3 or 4 child nodes), each of which may become parent node for another split into child nodes. In addition to the quad-tree split mode, new split modes (binary tree symmetric split modes, binary tree asymmetric split modes and triple tree split modes) are also defined that increase the total number of possible split modes. The coding tree has a unique root node, e.g. a CTU. A leaf of the coding tree is a terminating node of the tree. Each node of the coding tree represents a CU that may be further split into smaller CUs also named sub-CUs or more generally sub-blocks. Once the partitioning of a CTU into CUs is determined, CUs corresponding to the leaves of the coding tree are encoded. The partitioning of a CTU into CUs and the coding parameters used for encoding each CU (corresponding to a leaf of the coding tree) may be determined on the encoder side through a rate distortion optimization procedure. There is no partitioning of a CB into PBs and TBs, i.e. a CU is made of a single PU and a single TU.

In the following, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

Back to FIG. 2, in the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Residuals are calculated by subtracting (110) a predicted sample block (also known as a predictor) from the original picture block.

CUs in intra mode are predicted from reconstructed neighboring samples, e.g. within the same slice. A set of 35 intra prediction modes is available in HEVC, including a DC, a planar, and 33 angular prediction modes. CUs in inter mode are predicted from reconstructed samples of a reference picture stored in a reference picture buffer (180).

The residuals are transformed (125) and quantized (130). The quantized transform coefficients, as well as motion vectors and other syntax elements, are entropy coded (145) to output a bitstream. The encoder may also skip the transform or bypass both transform and quantization, i.e., the residual is coded directly without the application of the transform or quantization processes.

The entropy coding may be, e.g., Context Adaptive Binary Arithmetic Coding (CABAC), Context Adaptive Variable Length Coding (CAVLC), Huffman, arithmetic, exp-Golomb, etc. CABAC is a method of entropy coding first introduced in H.264 and also used in HEVC. CABAC involves binarization, context modeling and binary arithmetic coding. Binarization maps the syntax elements to binary symbols (bins). Context modeling determines the probability of each regularly coded bin (i.e. non-bypassed) based on some specific context. Finally, binary arithmetic coding compresses the bins to bits according to the determined probability.

The encoder comprises a decoding loop and thus decodes an encoded block to provide a reference for further predictions. The quantized transform coefficients are de-quantized (140) and inverse transformed (150) to decode residuals. A picture block is reconstructed by combining (155) the decoded residuals and the predicted sample block. Optionally, in-loop filter(s) (165) is applied to the reconstructed picture, for example, to perform DBF (DeBlocking Filter)/SAO (Sample Adaptive Offset)/ALF (Adaptive Loop Filtering) to reduce coding artifacts. The filtered picture may be stored in a reference picture buffer (180) and used as reference for other pictures. In the present embodiment, refinement data are determined (190) from the filtered reconstructed picture, i.e. output of the in-loop filter(s), and its original version. In a first variant, refinement data are determined (190) from the reconstructed picture before in-loop filtering and its original version. In a second variant, refinement data are determined (190) from the reconstructed picture partially filtered, e.g. after deblocking filtering but before SAO, and its original version. The refinement data are representative of a correcting function, noted R( ) that applies to individual sample(s) of a color component (e.g. the luma component Y, or the chroma components Cb/Cr, or the color components R, G, or B). The refinement data are then entropy coded in the bitstream. In this embodiment, the refinement process is out of the decoding loop. Therefore, the refinement process is only applied in the decoder as a post-processing.

Figure 3:
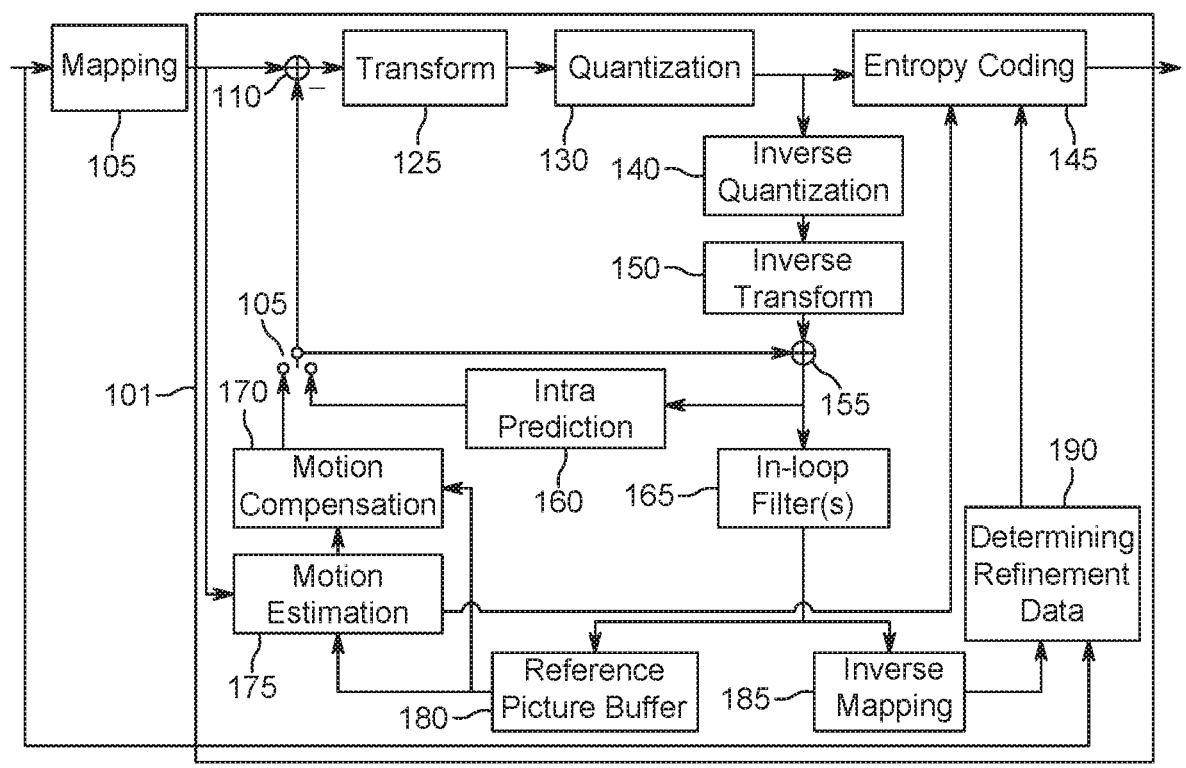
FIGS. 3 and 4 illustrate variants of the video encoder of FIG. 2.

FIG. 3 illustrates a variant 101 of the video encoder 100 of FIG. 2. The modules of FIG. 3 identical to the modules of FIG. 2 are labelled with the same numerical references and are not further disclosed. Before being encoded by the video encoder 101, a picture may be mapped (105). Such mapping may be used to better exploit the sample codewords values distribution of the pictures. In general, mapping applies on the original (input) samples prior to core encoding as illustrated in FIG. 3. Usually, static mapping functions, i.e. the same functions for all content, are used in order to limit the complexity. The mapping function fmap( ), possibly modeled by a 1D look-up-table LUTmap[x], x being a value, directly applies to the input signal x as follows:

$$y=fmap(x) \text{ or}$$

$$y=\text{LUTmap}[x]$$

where x is the input signal (for instance from 0 to 1023 for a 10-bit signal) and y is the mapped signal.

In a variant, the mapping function for one component depends on another component (cross-component mapping function). For instance, the chroma component c is mapped depending on the luma component y located at the same relative position in the picture. Chroma component c is mapped as follows:

$$c=\text{offset}+fmap(y)*(c-\text{offset}) \text{ or}$$

$$c=\text{offset}+\text{LUTmap}[y]*(c-\text{offset})$$

where offset is usually the center value of the chroma signal (for instance 512 for a 10-bit chroma signal). This parameter can also be a dynamic parameter, coded in the stream, which may end-up in improved compression gains.

The mapping functions can be defined by default, or signaled in the bitstream, e.g. using piece-wise linear models, scaling tables, or delta QP (dQP) tables.

The filtered reconstructed picture, i.e. the output of the in-loop filter(s), is inverse mapped (185). The inverse mapping (185) is an implementation of the inverse process of the mapping (105). Refinement data are determined (190) from the filtered reconstructed picture after inverse mapping and its original version. The refinement data are then entropy coded in the bitstream. In this embodiment, the refinement process is out of the decoding loop. Therefore, the refinement process is only applied in the decoder as a post-processing.

Figure 4:
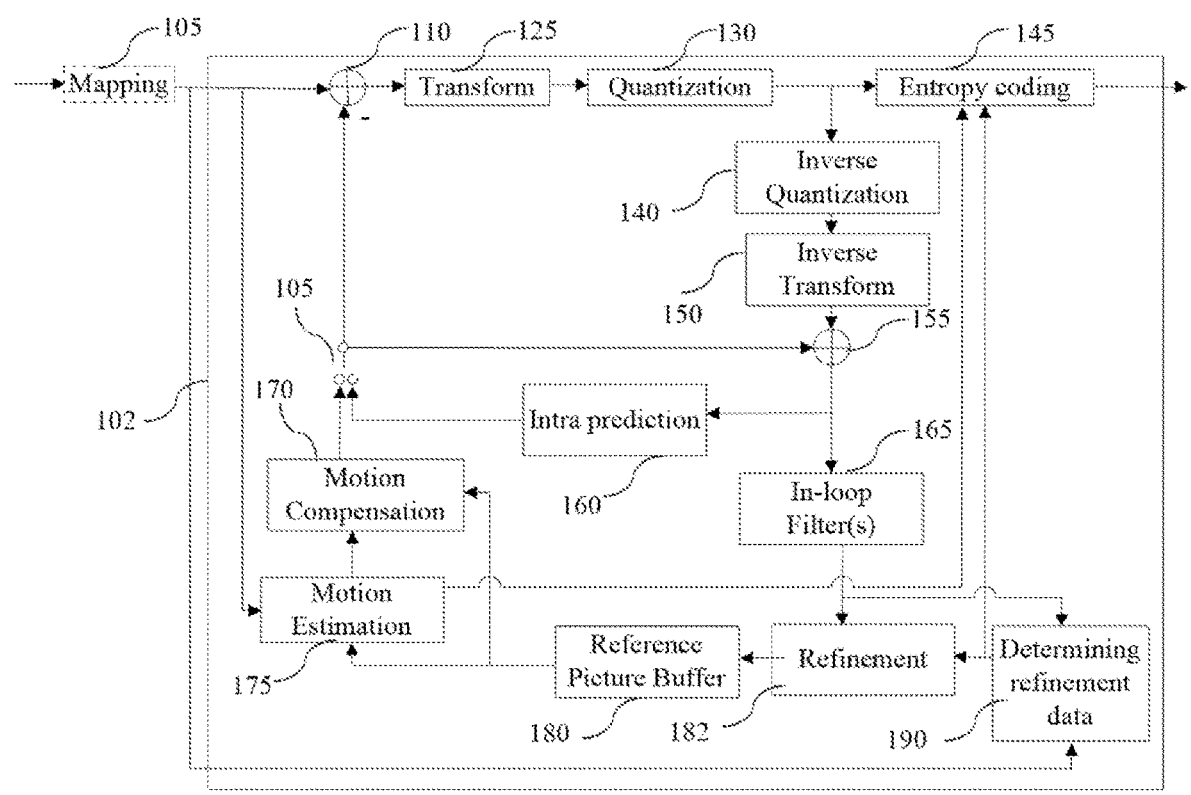

FIG. 4 illustrates a variant 102 of the video encoder 100 of FIG. 2. The modules of FIG. 4 identical to the modules of FIG. 2 are labelled with the same numerical references and are not further disclosed. The mapping module 105 is optional. Refinement data are determined (190) from the filtered reconstructed picture, i.e. output of the in-loop filter(s), and its original version when mapping does not apply, or from its mapped original version when mapping applies. The refinement data are then entropy coded (145) in the bitstream. The filtered reconstructed picture is also refined (182) using the refinement data. The refined picture is stored in the reference picture buffer (180) instead of the filtered reconstructed picture. In this embodiment, the refinement process is an in-loop process, i.e. it is part of the decoding loop. Therefore, the refinement process applies both in the decoding loop of the encoder and of the decoder. The modules 182 and 190 may be inserted in different locations. The module 182 of refinement may be inserted before the in-loop filter(s) or in between the in-loop filter(s) in case of at least two in-loop filters, e.g. after the DBF and before the SAO. The module 190 is positioned so that it takes as input the same picture as the refinement module 182, i.e. the reconstructed picture in the case where the module 182 is before the in-loop filters, the partially filtered reconstructed picture in the case where the module 182 is in-between the in-loop filters.

FIG. 5 represents a flowchart of a method for encoding a picture part in a bitstream according to a specific and non-limiting embodiment.

The method starts at step S100. At step S110, a transmitter 1000, e.g. such as the encoder 100, 101 or 102, accesses a picture part. Before being encoded the accessed picture part may optionally be mapped as in FIGS. 3 and 4. At step S120, the transmitter encodes and reconstructs the accessed picture part in order to obtain a reconstructed picture part. To this aim, the picture part may be split into blocks. Encoding the picture part comprises encoding the blocks of the picture part. Encoding a block usually but not necessarily comprises subtracting a predictor from the block to obtain a block of residuals, transforming the block of residuals into a block of transform coefficients, quantizing the block of coefficients with a quantization step size to obtain a quantized block of transform coefficients and entropy coding the quantized block of transform coefficients in the bitstream. Reconstructing a block on the encoder side usually but not necessarily comprises de-quantizing and inverse transforming the quantized block of transform coefficients to obtain a block of residuals and adding the predictor to the block of residuals to obtain a decoded block. The reconstructed picture part may then be filtered by in-loop filters(s), e.g. deblocking/SAO/ALF filters as in FIGS. 2-4 and also inverse mapped as in FIG. 3.

At step S130, refinement data are determined, e.g. by the module 190, such that a rate distortion cost computed as a weighted sum of data coding cost (i.e. coding cost of refinement data and of the refined picture part) and of a distortion between an original version of the picture part, i.e. the accessed image part, possibly mapped as in FIG. 4 and the reconstructed picture part possibly filtered as in FIGS. 2 and 4 or inverse mapped as in FIG. 3 and refined is decreased or minimized. More precisely, the refinement data are determined such that:

a rate distortion cost computed as a weighted sum of data coding cost (i.e. coding cost of refinement data and of the refined picture part) and of a distortion between an original version of said picture part and said reconstructed picture part after refinement by said refinement data is decreased compared to a rate distortion cost computed as a weighted sum of data coding cost (i.e. coding cost of the picture part without refinement) and of a distortion between said original version of said picture part and said reconstructed picture part without refinement in the case where no mapping applies before coding as in FIG. 2 and FIG. 4 without mapping;

a rate distortion cost computed as a weighted sum of data coding cost (coding cost of refinement data and of the refined picture part) and of a distortion between an original version of said picture part and said reconstructed picture part after inverse mapping and refinement by said refinement data is decreased compared to a rate distortion cost computed as a weighted sum of data coding cost and of a distortion between said original version of said picture part and said reconstructed picture part after inverse mapping without refinement in the case where mapping applies before coding and said refinement is out of the decoding loop as in FIG. 3 (with mapping and out of the loop refinement);

a rate distortion cost computed as a weighted sum of data coding cost and of a distortion between a mapped original version of said picture part and said reconstructed picture part after refinement by said refinement data is decreased compared to a rate distortion cost computed as a weighted sum of data coding cost and of a distortion between said mapped original version of said picture part and said reconstructed picture part without refinement in the case where mapping applies before coding and said refinement is in the decoding loop as in FIG. 4 with mapping.

The reconstructed picture part used to determine refinement data may be the in-loop filtered version or the in-loop partially filtered version of the reconstructed picture part.

In a specific and non-limiting embodiment, the refinement data noted R are advantageously modeled by a piece-wise linear model (PWL), defined by N couples (R_idx[k], R_val [k]), k=0 to N−1. Each couple defines a pivot point of the PWL model. The step S130 is detailed on FIGS. 6-11. R_idx[k] is typically a value in the range of the considered signal, for instance in the range 0 to 1023 for a 10-bit signal. Advantageously, R_idx[k] is greater than R_idx[k−1].

At step S140, the refinement data are encoded in the bitstream.

The following syntax is proposed. It considers that the three components are refined. In variants, syntax for only some of the components (for instance, only for the two chroma components) may be coded and applied. The refinement data are encoded in the form of a refinement table.

```
refinement_data( ) {
    refinement_table_new_flag
    if( refinement_table_new_flag ) {
        refinement_table_flag_luma
        if( refinement_table_flag_luma ) {
            refinement_table_luma_size
            for( i = 0; i < refinement_table_luma_size; i++) {
                refinement_luma_idx[ i ]
                refinement_luma_value[ i ]
            }
        }
        refinement_table_flag_cb
        if( refinement_table_flag_cb ) {
            refinement_table_cb_size
            for( i = 0; i < refinement_table_cb_size; i++ ) {
                refinement_cb_idx [ i ]
                refinement_cb_value[ i ]
            }
        }
        refinement_table_flag_cr
        if( refinement_table_flag_cr ) {
            refinement_table_cr_size
            for( i = 0; i < refinement_table_cr_size; i++ ) {
                refinement_cr_idx[ i ]
                refinement_cr_value[ i ]
            }
        }
    }
}
```

If refinement_table_new_flag is equal to 0, or refinement_table_flag_luma is equal to 0, no refinement applies for luma.

Otherwise, for all pt from 0 to (refinement_table_luma_size−1), the luma refinement values (R_idx[pt], R_val[pt]) are computed as follows:

$R\_idx[pt]$ is set equal to (default_$idx[pt]$+ refinement_luma_$idx[pt]$)

$R\_val[pt]$ is set equal to (NeutralVal+refinement_luma_value[$pt$])

A similar process applies for cb or cr component.

For example, NeutralVal=128. It may be used to initialize the values R_val in the step S130 as detailed in FIGS. 6 and 9. NeutralVal and default_idx[pt] may be default values known on both encoder and decoder sides in which case they do not need to be transmitted. In a variant, NeutralVal and default_idx[pt] may be values encoded in the bitstream.

Preferably, default_idx[pt], for pt from 0 to (refinement_table_luma_size−1), is defined as:

default_$idx[pt]$=(MaxVal/(refinement_table_luma_size−1))*$pt$ or default_$idx[pt]$=((MaxVal+1)/(refinement_table_luma_size−1))*$pt$ which corresponds to equi-distant indexes from 0 to MaxVal or (Max+1), MaxVal being the maximum value of the signal (for instance 1023 when the signal is represented with 10 bits).

In a variant, when mapping applies and is based on a PWL mapping table defined by couples (map_idx[k], map_val[k]), R_idx[k], for k=0 to N−1, is initialized by map_idx[k]. In other words, default_idx[k] is equal to map_idx[k]. Similarly, R_val[k], for k=0 to N−1, can be in another variant initialized by map_val[k], for k=0 to N−1.

Syntax elements refinement_table_luma_size, refinement_table_cb_size, refinement_table_cr_size can be defined by default, in which case they do not need to be coded in the stream.

In case of equi-distant points of the luma PWL model, refinement_luma_idx[pt] does not need to be coded. refinement_luma_idx[pt] is set to 0, such that R_idx[pt]=default_idx[pt] for pt from 0 to (refinement_table_luma_size−1). The same applies to cb or cr tables.

In a variant, a syntax element can be added per table to indicate which refinement mode is used (between intra-component (mode 1) and or inter-component (mode 2)). The syntax element can be signaled at the SPS, PPS, slice, tile or CTU level.

In a variant, a syntax element can be added per table to indicate if the table is applied as a multiplicative operator or as an additive operator. The syntax element can be signaled at the SPS, PPS, slice, tile or CTU level.

In an embodiment, the refinement tables are not coded in the bitstream. Instead, the default inverse mapping tables (corresponding to the inverse of the mapping tables used by the mapping 105 on FIGS. 3 and 4) are modified by the refinement tables, and the modified inverse mapping tables are coded in the bitstream.

In an embodiment, the refinement tables are only coded for pictures of low temporal levels. For instance, the tables are coded only for pictures of temporal level 0 (lowest level in the temporal coding hierarchy).

In an embodiment, the refinement tables are only coded for random access pictures, such as intra pictures.

In an embodiment, the refinement tables are only coded for pictures of high quality, corresponding to an average QP over the picture below a given value.

In an embodiment, a refinement table is coded only if the refinement table coding cost relatively to the full picture coding cost is below a given value.

In an embodiment, a refinement table is coded only if the rate-distortion gain compared to not coding the refinement table is above a given value. For instance, the following rules may apply:
- if the rate-distortion cost gain is larger than (0.01*width*height), where width and height are the dimensions of the considered component, then the table is coded.
- if the rate-distortion cost gain is larger than (0.0025*initRD), where initRD is the rate-distortion cost when the refinement of the component does not apply, then the table is coded. This approximately corresponds to a minimum PSNR gain of 0.01 dB when rate-distortion cost is based on the square error distortion. If the given value is set to (0.01*initRD), this approximately corresponds to a minimum PSNR gain of 0.05 dB when rate-distortion cost is based on the square error distortion. The proposed values can be modified.

Back to FIG. 5, at an optional step S150, the refinement data are applied on the reconstructed picture part possibly filtered as in FIG. 4.

To this aim, a look-up-table LutR is determined from the couples of points of the PWL (R_idx[pt], R_val[pt]) for pt=0 to N−1.

For example LutR is determined by linear interpolation between each couple of points of the PWL (R_idx[pt], R_val[pt]) and (R_idx[pt+1], R_val[pt+1]), as follows: For pt=0 to N−2

For $idx=R\_idx[pt]$ to $(R\_idx[pt+1]-1)$ $LutR[idx]=R\_val[pt]+(R\_val[pt+1]-R\_val[pt])*(idx-R\_idx[pt])/(R\_idx[pt+1]-R\_idx[pt])$ In a variant, LutR is determined as follows:
For pt=0 to N−2

For $idx=R\_idx[pt]$ to $(R\_idx[pt+1]-1)$ $LutR[idx]=(R\_val[pt]+R\_val[pt+1])/2$ Two refinement modes are proposed:
Mode 1—intra-component refinement. In mode 1, the refinement is performed independently of other components. The signal Srec(p) is refined as follows:

$Sout(p)=LutR[Srec(p)]/NeutralVal*Srec(p)$ where Srec(p) is the reconstructed signal to be refined at location p in the picture part and corresponds to the signal coming from the in-loop filter(s) or possibly coming from the inverse mapping and Sout(p) is the refined signal. It is considered here that the signals Srec and Sout use the same bit depth. When using different bit depths for both signals (namely Bout for Sout and Brec for Srec), a scaling factor related to the bit depth difference may be applied.

This operation can be directly implemented using a 1D-LUT LutRF such that $Sout(p)=LutRF[Srec(p)]=LutR[Srec(p)]/NeutralVal*Srec(p)$ For instance, the formula is adapted as follows when the bit depth Bout of Sout is higher than the bit depth Brec of Srec:

$Sout(p)=2^{(Bout-Brec)}*LutR[Srec(p)]/NeutralVal*Srec(p)$

The scaling factor can be directly integrated in LutR values. This operation can be directly implemented using a 1D-LUT LutRF such that $$Sout(p)=LutRF[Srec(p)]=2^{(Bout-Brec)}*LutR[Srec(p)]/NeutralVal*Srec(p)$$

For instance, the formula is adapted as follows when the bit depth Bout of Sout is lower than the bit depth Brec of Srec:

$$Sout(p)=LutR[Srec(p)]/NeutralVal*Srec(p)/2^{(Brec-Bout)}$$

The scaling factor can be directly integrated in LutR values. This operation can be directly implemented using a 1D-LUT LutRF such that $$Sout(p)=LutRF[Srec(p)]=LutR[Srec(p)]/NeutralVal*Srec(p)/2^{(Brec-Bout)}$$

Advantageously, this mode is used for the luma component.

Mode 2—inter-component refinement. In mode 2, the refinement is performed for one component C0 and depends on another component C1. The signal Srec_C0(p) is refined as follows:

$$Sout(p)=\text{offset}+LutR[Srec\_C1(p)]/NeutralVal*(Srec\_C0(p)-\text{offset})$$

where offset is for example set to (MaxVal/2), Srec_C0(p) is the reconstructed signal of the component C0 to be refined, p is the sample location in the picture part. MaxVal is the max value of the signal Srec_C0 and is computed as $(2^B-1)$, where B is the bit depth of the signal. Srec_C1(p) is the reconstructed signal of the component C1. Srec_C1(p) can be the signal coming from the in-loop filters, or from the inverse mapping. Srec_C1(p) may also be further filtered, e.g. with a low pass filter, after having been filtered by the in-loop filter(s). It is considered here that the signals Srec_C0, Srec_C1 and Sout use the same bit depth. Advantageously, the mode 2 applies to chroma components and depends on luma component.

The formula is adapted as follows when the bit depth Bout of Sout is higher than the bit depth Brec of Srec_C0 and Srec_C1:

$$Sout(p)=2^{(Bout-Brec)}*(\text{offset}+LutR[Srec\_C1(p)]/NeutralVal*(Srec\_C0(p)-\text{offset}))$$

The formula is adapted as follows when the bit depth Bout of Sout is lower than the bit depth Brec of Srec_C0 and Srec_C1:

$$Sout(p)=(\text{offset}+LutR[Srec\_C1(p)]/NeutralVal*(Srec\_C0(p)-\text{offset}))/2^{(Bout-Brec)}$$

Rounding and clipping between the minimum and maximum signal values (typically 0 and 1023 for a 10-bits signal) are finally applied to the refined values Sout(p).

In the above embodiment, the refinement applies as a multiplicative operator.

In a variant, the refinement applies as an additive operator. In this case, in mode 1, the signal Srec(p) is refined as follows:

$$Sout(p)=LutR[Srec(p)]/NeutralVal+Srec(p)$$

In this case, in mode 2, the signal Srec_C0(p) is refined as follows:

$$Sout(p)=LutR[Srec\_C1(p)]/NeutralVal+Srec\_C0(p)$$

Example of cross-component refinement table values are shown below, for NeutralVal=64, and N=17, for the chroma components Cb and Cr:

| | | | | | | | | Cb | | | | | | | | | |
|---|---|---|---|---|---|---|---|---|---|---|---|---|---|---|---|---|---|
| k | 0 | 1 | 2 | 3 | 4 | 5 | 6 | 7 | 8 | 9 | 10 | 11 | 12 | 13 | 14 | 15 | 16 |
| R_idx[k] | 0 | 64 | 128 | 192 | 256 | 320 | 384 | 448 | 512 | 576 | 640 | 702 | 766 | 830 | 896 | 960 | 1024 |
| R_val[k] | 64 | 64 | 64 | 52 | 58 | 63 | 66 | 65 | 62 | 66 | 66 | 64 | 72 | 49 | 64 | 64 | 64 |

| | | | | | | | | Cr | | | | | | | | | |
|---|---|---|---|---|---|---|---|---|---|---|---|---|---|---|---|---|---|
| K | 0 | 1 | 2 | 3 | 4 | 5 | 6 | 7 | 8 | 9 | 10 | 11 | 12 | 13 | 14 | 15 | 16 |
| R_idx[k] | 0 | 64 | 128 | 192 | 256 | 320 | 384 | 448 | 512 | 576 | 640 | 702 | 766 | 830 | 896 | 960 | 1024 |
| R_val[k] | 64 | 64 | 62 | 61 | 63 | 66 | 65 | 66 | 64 | 60 | 70 | 64 | 64 | 41 | 64 | 64 | 64 |

Back to FIG. 5, the method ends at step S160.

Figure 6:
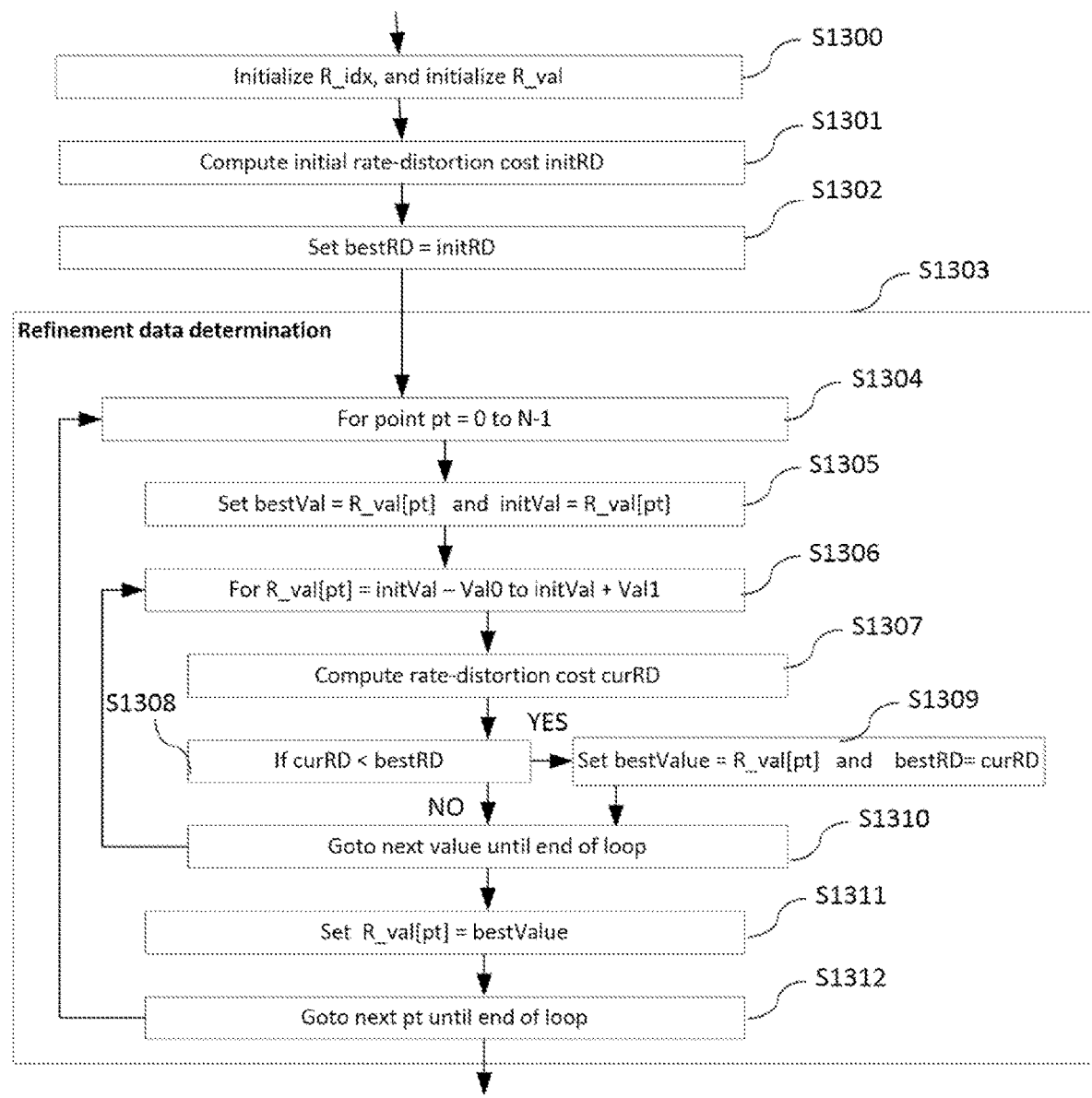
FIG. 6 represents a flowchart details step S130 of FIG. 5.
Figure 7:
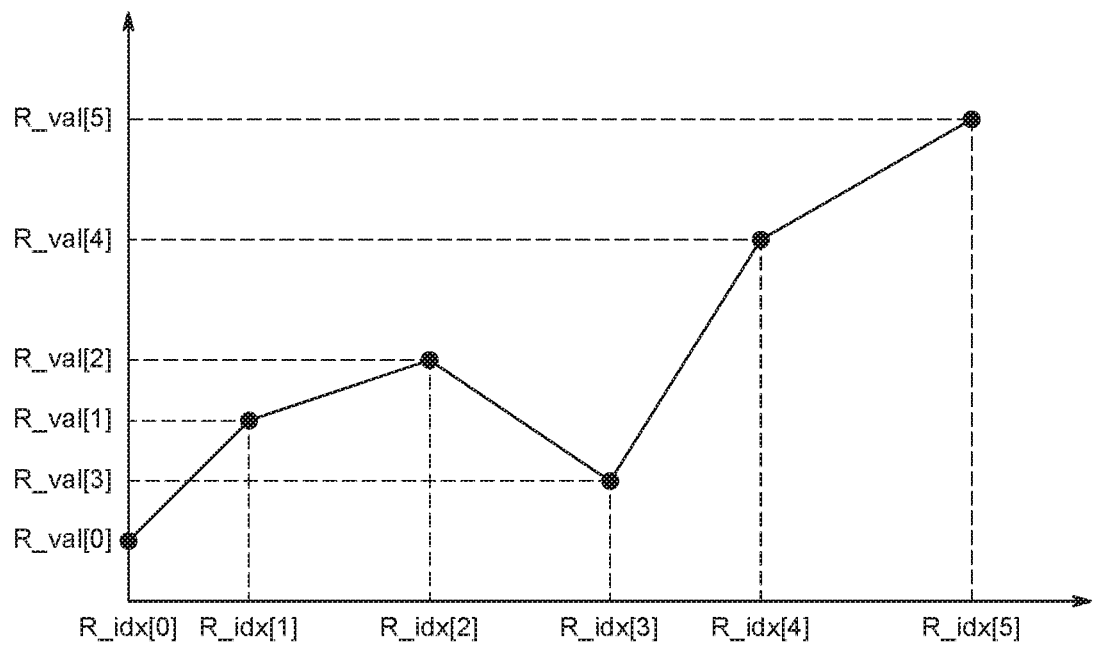
FIGS. 7 and 8 depict examples of a PWL model.

FIG. 6 represents a flowchart details step S130. The refinement data may be determined over a given picture area A, e.g. a slice, a tile or a CTU, or over the entire picture. The refinement data R is advantageously modeled by a piece-wise linear model (PWL), defined by N couples (R_idx[k], R_val[k]), k=0 to N−1. An example of PWL model is illustrated in the FIG. 7 where N=6 (k∈{0, 1, 2, 3, 5}). Each couple defines a pivot point of the PWL model.

The values R_idx and R_val are initialized (step S1300). Typically, R_idx[k] are initialized, for k=0 to N−1, such that there is an equidistant space between successive indexes, that is, (R_idx[k+1]−R_idx[k])=D, where D=Range/(N−1), Range being the range of the signal to refine (e.g. 1024 for a signal represented on 10 bits). In an example, N=17 or 33. The values R_val are initialized with values NeutralVal which are defined such that the refinement does not change the signal, e.g. 128. In a variant, when mapping applies and is based on a PWL mapping table defined by couples (map_idx[k], map_val[k]), (R_idx[k], R_val[k]), for k=0 to N−1, is initialized by (map_idx[k], map_val[k]).

In the embodiment of FIG. 6 only the values R_val[k] are determined. The values R_idx[k] are fixed to their initial values. The initial rate-distortion cost, initRD, is computed (step 1301) using R as initialized in S1300. The initial rate-distortion cost initRD is computed as follows:

$$initRD = L * Cost(R) + \Sigma_{P \text{ in } A} dist(Sin(p), Sout(p)) \quad (eq. 1)$$

where:
R is the refinement data as initialized in S1300,
A is the picture area for which the refinement is performed;
Sin(p) is defined as follows:
When no mapping applies, Sin(p) is the sample value of a pixel p in the original picture area;
When mapping applies and refinement is out of the loop (FIG. 3), Sin(p) is the sample value of a pixel p in the original picture area;
When mapping applies and refinement is in the loop (FIG. 4), Sin(p) is the sample value of a pixel p in the mapped original picture area;
Sout(p) is the sample value of the pixel p in the refined picture area;
dist(x,y) is the distortion between a sample value x and a sample value y, e.g. the distortion is the square error $(x-y)^2$; other possible distortion functions are the absolute difference |x−y|, or distortion based on subjective-oriented metrics such as the SSIM (Z. Wang, A. C. Bovik, H. R. Sheikh and E. P. Simoncelli, "*Image quality assessment: From error visibility to structural similarity*," IEEE Transactions on Image Processing, vol. 13, no. 4, pp. 600-612, April 2004) or variants of SSIM can also be used;
Cost(R) is the coding cost for coding the refinement data R and the refined picture area; and
L is a value associated with the picture area A. It is advantageously linearly dependent on $2^{(QP/6)}$ where QP is the quantization parameter when a single quantization parameter value is used inside the picture area A, or QP is representative of the quantization parameters applied to the picture area A when different quantization parameter values are used inside the picture area A. For instance, QP is the average of the QPs used inside the blocks of the area A.

In the case where, values R_val are initialized with values NeutralVal, the initial rate-distortion cost initRD may be computed with coding cost of the picture area without coding cost of refinement data.

A parameter bestRD is initialized to initRD at step S1302. The refinement data R are then determined at step S1303. A loop over the index pt of the successive pivot points of the PWL model R is performed at step S1304. At step S1305, parameters bestVal and initVal are initialized to R_val[pt]. A loop over various values of R_val[pt], namely from a value (initVal−Val0) to a value (initVal+Val1) is performed at step S1306, where Val0 and Val1 are predefined parameters. Typical values Val0=Val1=NeutralVal/4. The rate-distortion cost, curRD, is computed at step S1307 using equation 1 with the current R (with the current R_val[pt]). curRD and bestRD are compared at step S1308. If curRD is lower than bestRD, bestRD is set to curRD and bestValue is set to R_val[pt]. Otherwise the method continues at step S1310. At step S1310, it is checked whether the loop over the values of R_val[pt] ends. In the case where the loop ends, R_val[pt] is set to bestValue at step S1311. At step S1312, it is checked whether the loop over the values of pt ends. In the case where the loop ends, current R is the output refinement data.

Figure 8:
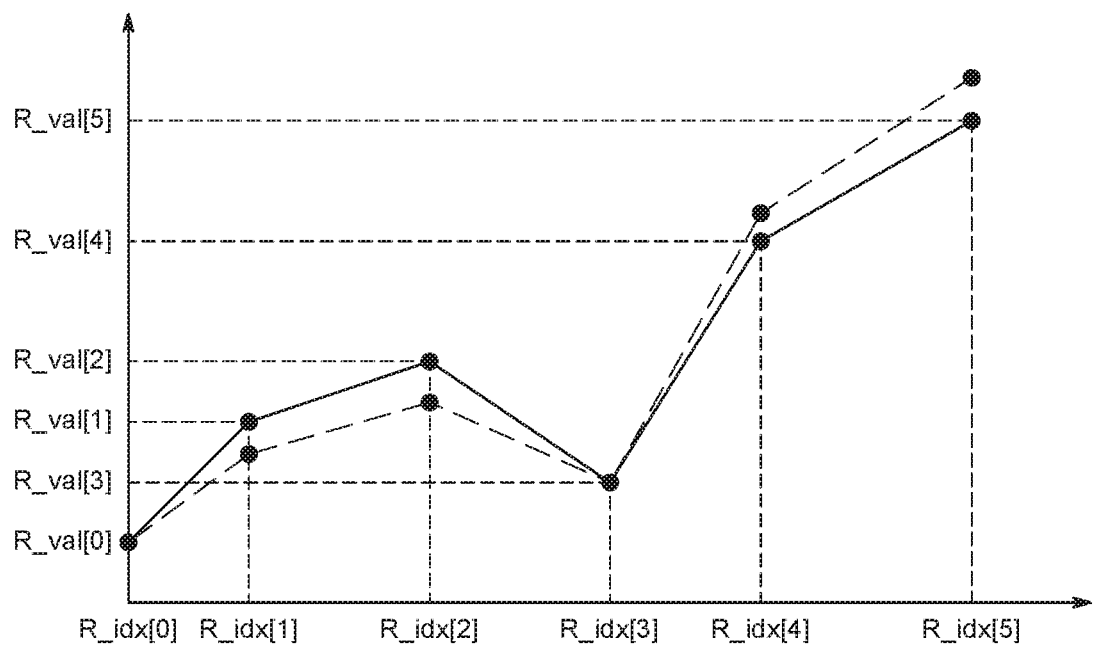

The step S1303 may be iterated n times, n being an integer whose value is fixed, e.g. n=3. FIG. 8 illustrates the determination of R_val. The dashed line represents the PWL after updating R_val.

Figure 9:
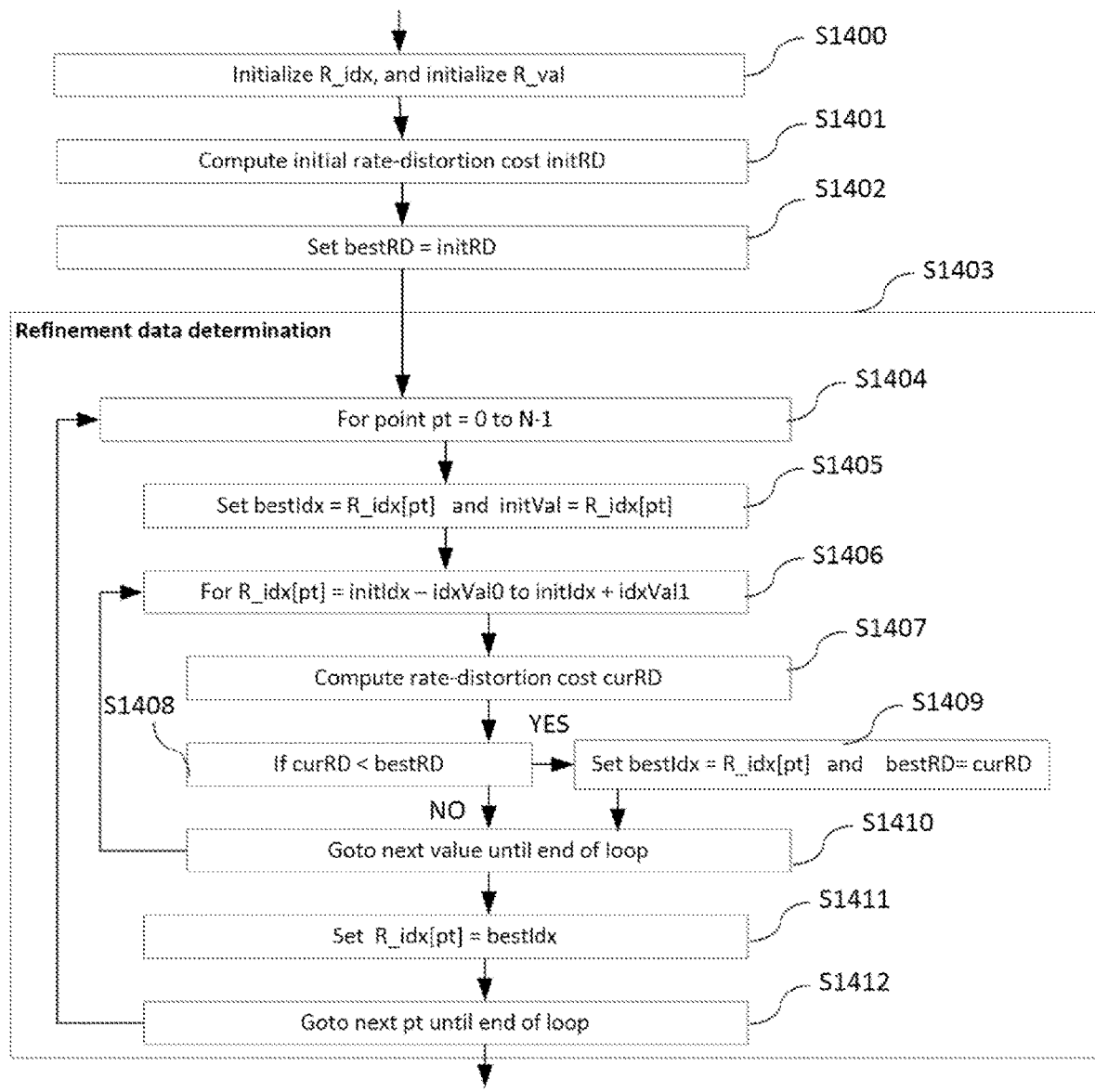
FIG. 9 represents a variant of the process of FIG. 6.

FIG. 9 represents a variant of the process of FIG. 6. In the embodiment of FIG. 9 only the values R_idx[k] are determined. The values R_val[k] are fixed to their initial values. The process uses as input initial R_idx and R_val data (for instance coming from the method of FIG. 6). The initial rate-distortion cost, initRD, is computed at step S1401 using (eq. 1). A parameter bestRD is initialized to initRD at step S1402. The refinement data R are then determined at step S1403. A loop over the index pt of the successive pivot points of the PWL model R is performed at step S1404. At step S1405, parameters bestIdx and initIdx are initialized to R_idx[pt]. A loop over various values (from initIdx−idxVal0 to initIdx+idxVal1) of R_idx[pt] is performed at step S1406, where idxVal0 and idxVal1 are defined values, e.g. idxVal0=idxVal1=D/4 where D=Range/(N−1), Range being the range of the signal to refine (e.g. 1024 for a signal represented on 10 bits). The rate-distortion cost, curRD, is computed at step S1407 using equation 1 with the current R (with the current R_idx[pt]). curRD and bestRD are compared at step S1408. If curRD is lower than bestRD, bestRD is set to curRD and bestIdx is set to R_idx[pt]. Otherwise the method continues at step S1310. At step S1410, it is checked whether the loop over the values of R_idx[pt] ends. In the case where the loop ends, R_idx[pt] is set to bestIdx at step S1411. At step S1412, it is checked whether the loop over the values of pt ends. In the case where the loop ends, current R is the output refinement data.

The step S1403 may be iterated n times, n being an integer whose value is fixed, e.g. n=3.

Figure 10:
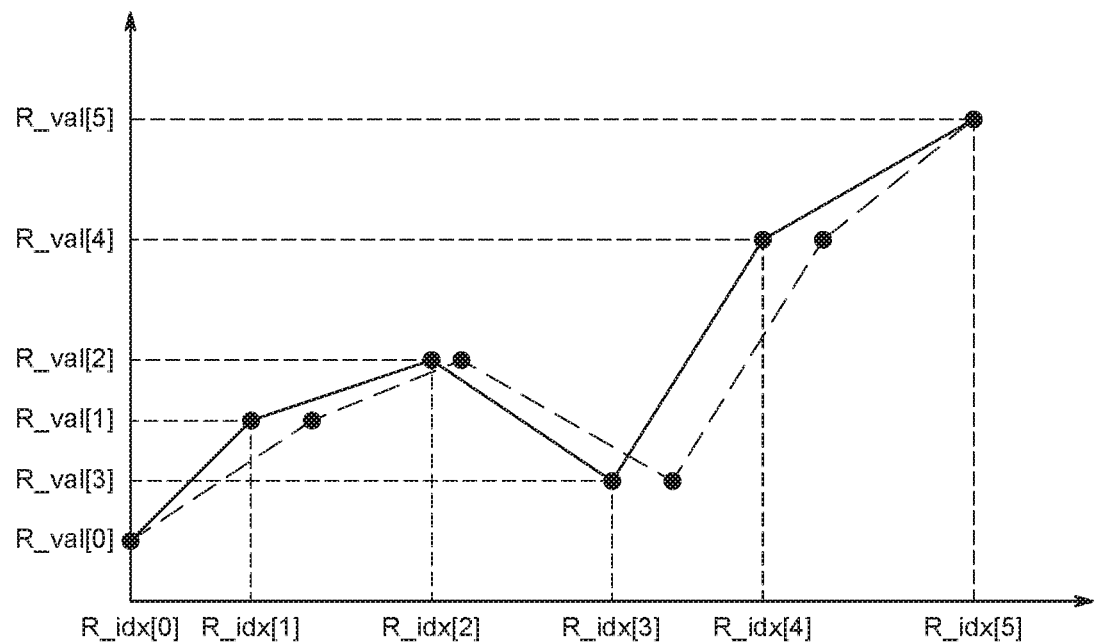
FIGS. 10 and 11 depict examples of a PWL model.
Figure 11:
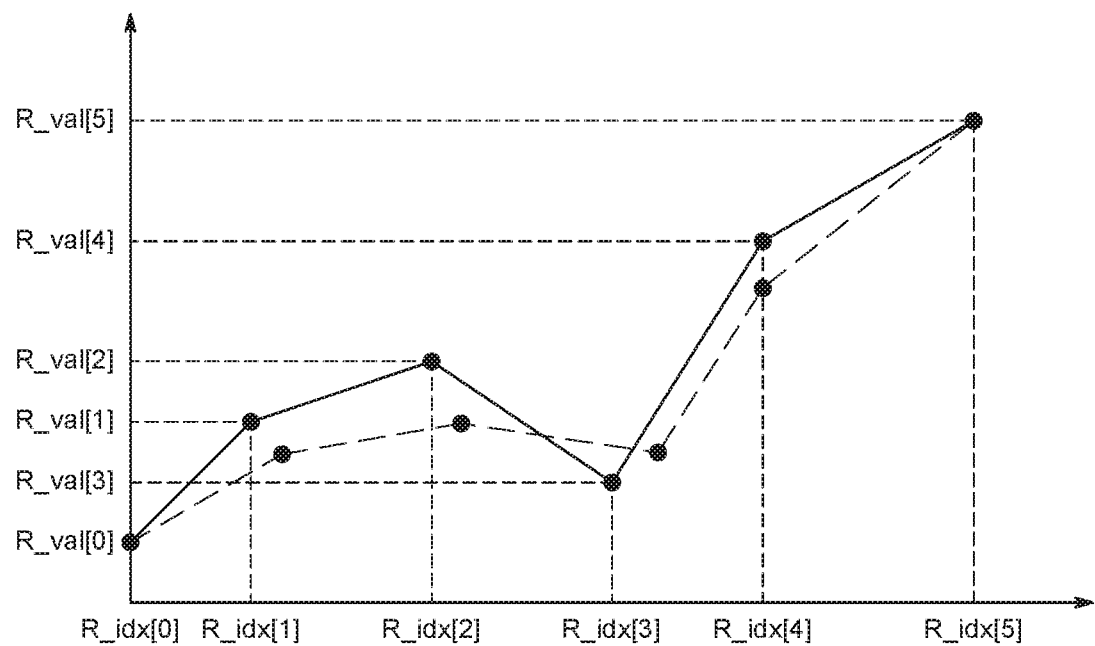

FIG. 10 illustrates the determination of R_idx. The dashed line represents the PWL after updating R_idx. FIG. 11 illustrates the determination of both R_idx and R_val. The dashed line represents the PWL after updating of R_val and R_idx.

Fast implementations for computing the distortion over the picture can be used in steps 1301, 1307, 1401 and 1407 when the distortion corresponds to the square error between the original sample value and the refined sample value. These implementations avoid full picture scanning.

For instance, if a direct mapping is used for the luma, the distortion over the picture array I, noted SSE, is computed as:

$$SSE = \underset{P \text{ in } I}{L} (Y_{orig}(p) - Y_{out}(p))^2$$

where $Y_{orig}(p)$ is the original picture luma sample at position p, and $Y_{out}(p)$ is the refined luma sample, that can be derived using the refinement LUT LutRF built from the PWL model:

$$Y_{out}(p) = LutRF[Y_{rec}(p)]$$

For the set $S_Y$ of pixels p such that the decoded sample $Y_{rec}(p)$ is equal to Y (mathematically noted as {p in I such that $Y_{rec}(p)=Y$}), the cumulated error $SSE_Y$ is $$SSE_Y = \underset{P \text{ in } S_Y}{L} (Y_{orig}(p) - LutRF[Y])^2 =$$

$$\underset{P \text{ in } S_Y}{L} Y_{orig}(p)^2 - 2 \cdot LutRF[Y] \cdot \underset{P \text{ in } S_Y}{L} Y_{orig}(p) + N_Y \cdot LutRF[Y]^2$$

where $N_Y$ is the number of occurrences in the decoded picture of the luma sample value Y (i.e. the number of elements of $S_Y$).

The total distortion SSE can be computed as:

$$SSE = \underset{Y=0}{\overset{2^{Brec}-1}{L}} SSE_Y$$

When changing a pivot point of the luma refinement PWL table, it is only required to recompute the new mapping values LutRF[Y] for Y values impacted by the modification of the pivot point, and then to update the SSE for these new mapping values.

In another example, if cross-component mapping is used for the chroma U (the same applies for V), the distortion over the picture is computed as:

$$SSE = \underset{P \text{ in } I}{L} (U_{orig}(p) - U_{out}(p))^2$$

where $U_{orig}(p)$ is the original picture chroma U sample at position p, and $U_{out}(p)$ can be derived using the refinement LUT LutR built from the PWL model:

$$U_{out}(p) = \text{offset} + LutR[Y_{rec}(p)] * (U_{rec}(p) - \text{offset})$$

(by neglecting the clipping, and considering for notation simplifications here that NeutralVal=1 and that Bout=Brec).

$$SSE = \underset{P \text{ in } I}{L} (U_{orig}(p) - \text{offset})^2 + LutR[Y_{rec}(p)]^2 \cdot \underset{P \text{ in } I}{L} (U_{rec}(p) - \text{offset})^2 -$$

$$2 \cdot LutR[Y_{rec}(p)] \cdot \underset{P \text{ in } I}{L} (U_{orig}(p) - \text{offset}) \cdot (U_{rec}(p) - \text{offset})$$

For the set $S_Y = \{p \text{ in } I \text{ such that } Y_{dec}(p)=Y\}$, the cumulated error is $$SSE_Y = \underset{P \text{ in } I}{L} (U_{orig}(p) - \text{offset})^2 + LutR[Y]^2 \cdot \underset{P \text{ in } S_Y}{L} (U_{dec}(p) - \text{offset})^2 -$$

$$2 \cdot LutR[Y] \cdot \underset{P \text{ in } I}{L} (U_{orig}(p) - \text{offset}) \cdot (U_{rec}(p) - \text{offset})$$

And the total distortion SSE can be computed as:

$$SSE = \underset{Y=0}{\overset{2^{Bluma}-1}{L}} SSE_Y$$

When changing a pivot point of the U (or V) refinement PWL table, it is only required to recompute the new mapping values LutR[Y] for Y values impacted by the modification of the pivot point, and then to update the SSE for these new mapping values.

Figure 12:
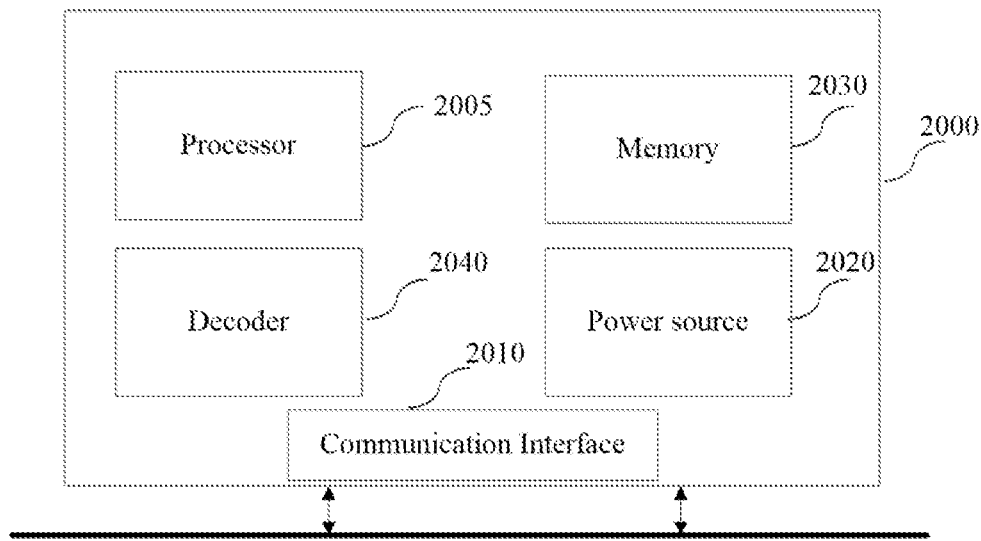
FIG. 12 represents an exemplary architecture of a receiver configured to decode a picture from a bitstream to obtain a decoded picture according to a specific and non-limiting embodiment.

FIG. 12 represents an exemplary architecture of a receiver 2000 configured to decode a picture from a bitstream to obtain a decoded picture according to a specific and non-limiting embodiment.

The receiver 2000 comprises one or more processor(s) 2005, which could comprise, for example, a CPU, a GPU and/or a DSP (English acronym of Digital Signal Processor), along with internal memory 2030 (e.g. RAM, ROM and/or EPROM). The receiver 2000 comprises one or more communication interface(s) 2010 (e.g. a keyboard, a mouse, a touchpad, a webcam), each adapted to display output information and/or allow a user to enter commands and/or data (e.g. the decoded picture); and a power source 2020 which may be external to the receiver 2000. The receiver 2000 may also comprise one or more network interface(s) (not shown). The decoder module 2040 represents the module that may be included in a device to perform the decoding functions. Additionally, the decoder module 2040 may be implemented as a separate element of the receiver 2000 or may be incorporated within processor(s) 2005 as a combination of hardware and software as known to those skilled in the art.

The bitstream may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the decoded picture may be sent to a destination, e.g. a display device. As an example, the decoded picture is stored in a remote or in a local memory, e.g. a video memory or a RAM, a hard disk. In a variant, the decoded picture is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 2000 further comprises a computer program stored in the memory 2030. The computer program comprises instructions which, when executed by the receiver 2000, in particular by the processor 2005, enable the receiver to execute the decoding method described with reference to FIG. 16. According to a variant, the computer program is stored externally to the receiver 2000 on a non-transitory digital data support, e.g. on an external storage medium such as a HDD, CD-ROM, DVD, a read-only and/or DVD drive and/or a DVD Read/Write drive, all known in the art. The receiver 2000 thus comprises a mechanism to read the computer program. Further, the receiver 2000 could access one or more Universal Serial Bus (USB)-type storage devices (e.g., "memory sticks.") through corresponding USB ports (not shown).

According to exemplary and non-limiting embodiments, the receiver 2000 can be, but is not limited to:
- a mobile device;
- a communication device;
- a game device;
- a set top box;
- a TV set;
- a tablet (or tablet computer);
- a laptop;
- a video player, e.g. a Blu-ray player, a DVD player;
- a display; and
- a decoding chip or decoding device/apparatus.

Figure 13:
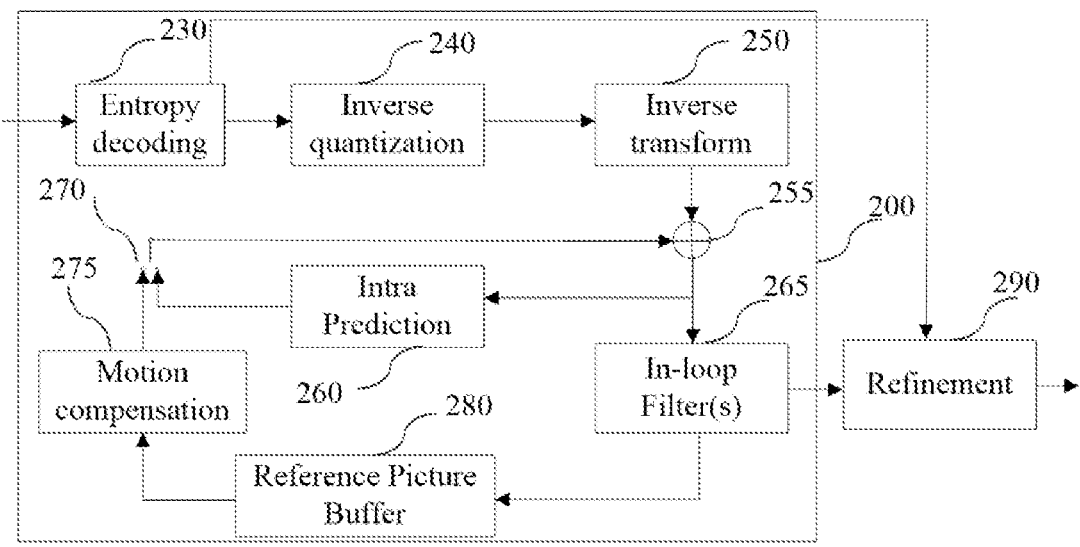
FIG. 13 illustrates a block diagram of an exemplary video decoder, e.g. of the HEVC type, adapted to execute the decoding method.
Figure 16:
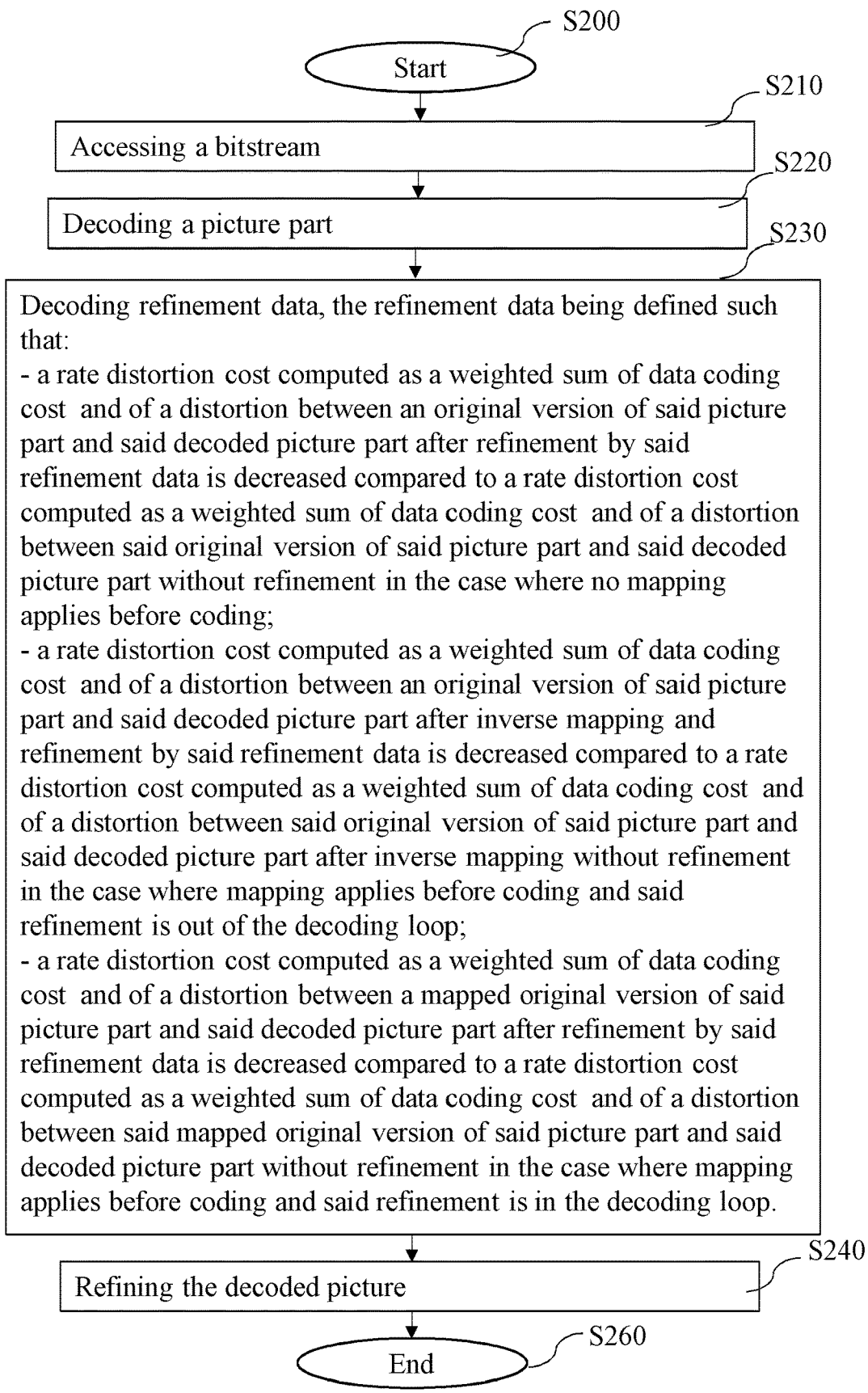
FIG. 16 represents a flowchart of a method for decoding a picture from a bitstream according to a specific and non-limiting embodiment.

FIG. 13 illustrates a block diagram of an exemplary video decoder 200, e.g. of the HEVC type, adapted to execute the decoding method of FIG. 16. The video decoder 200 is an example of a receiver 2000 or part of such a receiver 2000. In the exemplary decoder 200, a bitstream is decoded by the decoder elements as described below. Video decoder 200 generally performs a decoding pass reciprocal to the encoding pass as described in FIG. 2, which performs video decoding as part of encoding video data.

In particular, the input of the decoder includes a video bitstream, which may be generated by the video encoder 100. The bitstream is first entropy decoded (230) to obtain transform coefficients, motion vectors, and other coded information, e.g. refinement data. The transform coefficients are de-quantized (240) and inverse transformed (250) to decode residuals. The decoded residuals are then combined (255) with a predicted block (also known as a predictor) to obtain a decoded/reconstructed picture block. The predicted block may be obtained (270) from intra prediction (260) or motion-compensated prediction (i.e., inter prediction) (275). As described above, AMVP and merge mode techniques may be used during motion compensation, which may use interpolation filters to calculate interpolated values for sub-integer samples of a reference block. An in-loop filter (265) is applied to the reconstructed picture. The in-loop filter may comprise a deblocking filter and a SAO filter. The filtered picture is stored at a reference picture buffer (280). The reconstructed picture possibly filtered is refined (290). Refinement is out of the decoding loop and is applied as a post-processing process.

Figure 14:
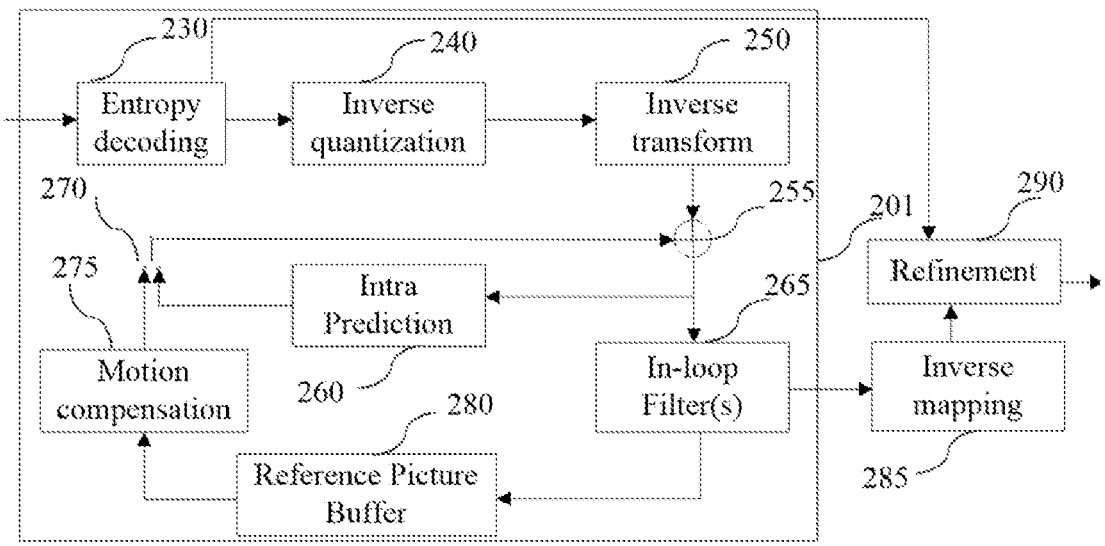
FIG. 14 illustrates a variant of the video decoder of FIG. 13.

FIG. 14 illustrates a variant 201 of the video decoder 200 of FIG. 13. The modules of FIG. 14 identical to the modules of FIG. 13 are labelled with the same numerical references and are not further disclosed.

The filtered reconstructed picture, i.e. the output of the in-loop filter(s), is inverse mapped (285). The inverse mapping (285) is the inverse process of the mapping (105) applied on the encoder side. The inverse mapping may use inverse mapping tables decoded from the bitstream or default inverse mapping tables. The inverse mapped picture is refined (290) using refinement data decoded (230) from the bitstream.

In a variant, the inverse mapping and refinement are merged in a single module that applies inverse mapping using inverse mapping tables decoded from the bitstream wherein the inverse mapping tables are modified in the encoder to take into account the refinement data. In a variant, for a given component being processed, a look-up-table LutComb is applied to perform the inverse mapping and refinement processes, and this look-up-table is built as the concatenation of the look-up-table LutInvMap derived from the mapping table, and of the look-up table derived from the refinement table LutR:

$$\text{LutComb}[x] = \text{Lut}R[\text{LutInvMap}[x]], \text{ for } x=0 \text{ to MaxVal}$$

In this embodiment, the refinement process is out of the decoding loop. Therefore, the refinement process is only applied in the decoder as a post-processing.

Figure 15:
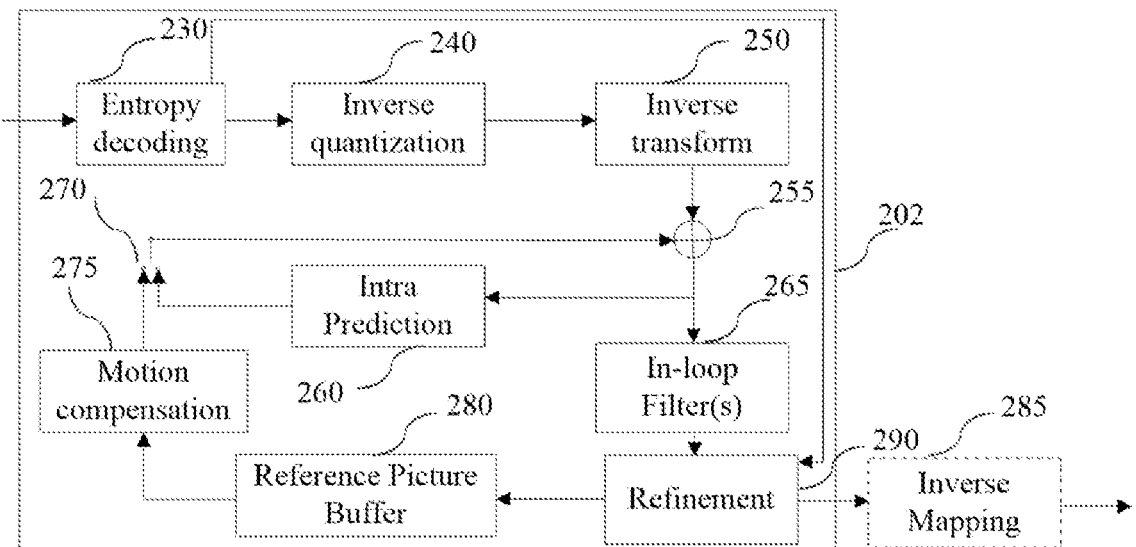
FIG. 15 illustrates a variant of the video decoder of FIG. 13.

FIG. 15 illustrates a variant 202 of the video decoder 200 of FIG. 13. The modules of FIG. 15 identical to the modules of FIG. 13 are labelled with the same numerical references and are not further disclosed.

Refinement data are decoded from the bitstream (230). The filtered reconstructed picture is refined (290) using the decoded refinement data. The refined picture is stored in the reference picture buffer (280) instead of the filtered reconstructed picture. The module 290 may be inserted in different locations. The module 290 of refinement may be inserted before the in-loop filter(s) or in between the in-loop filter(s) in case of at least two in-loop filters, e.g. after the DBF and before the SAO. The refined picture may optionally be inverse mapped (285).

In this embodiment, the refinement process is in the decoding loop.

FIG. 16 represents a flowchart of a method for decoding a picture from a bitstream according to a specific and non-limiting embodiment.

The method starts at step S200. At step S210, a receiver 2000 such as the decoder 200 accesses a bitstream. At step S220, the receiver decodes a picture part from the bitstream to obtain a decoded picture part. To this aim, the blocks of the picture part are decoded. Decoding a block usually but not necessarily comprises entropy decoding a portion of the bitstream representative of the block to obtain a block of transform coefficients, de-quantizing and inverse transforming the block of transform coefficients to obtain a block of residuals and adding a predictor to the block of residuals to obtain a decoded block. The decoded picture part may then be filtered by in-loop filter(s) as in FIGS. 13-15 and also inverse mapped as in FIG. 14.

At step S230, refinement data are decoded from the bitstream. This step is the inverse of the encoding step S140. All variants and embodiments disclosed with respect to step S140 apply to step S230.

At step S240, the decoded picture is refined. This step is identical to the refinement step S150 of the encoder side.

In another embodiment, a Dynamic Range Adaptation (DRA) process is a signal adaptation applied as a pre-processing at the encoder side, with the aim to improve the coding efficiency. At the decoder side, the inverse process is applied.

The DRA and inverse DRA can be based on static tables. For HLG content, no DRA is used. For PQ content, the scaling table (Post processing) is independent from the content and is based on the dQP table used. The following scaling factors correspond to $2^{dQP/6}$.

| Y value | 0 | 301 | 367 | 434 | 501 | 567 | 634 | 701 | 767 | 834 |
|---|---|---|---|---|---|---|---|---|---|---|
| Scaling | 1.0000 | 1.1230 | 1.2598 | 1.4141 | 1.5879 | 1.7813 | 2.0000 | 2.2441 | 2.5195 | 2.8281 |

The post-decoding refinement process can apply per slice. It aims at correcting the distortion resulting from the compression and impacting the inverse Dynamic Range Adaptation (DRA) process. The inverse mapped signal (Y,U,V) is refined as follows:

For luma component, intra-component scaling is applied, corresponding to the following:

$$Y_{refine} = \text{Min}(2^{Blum}-1, \text{LUT}_{refineY}[Y]*Y)$$

Note: this can be achieved using a direct LUT

For chroma components, luma-dependent scaling is applied, corresponding to the following:

$$U_{refine} = \text{Max}(0, 2^{Bchr}-1, \text{Min}(2^{Bchr}-1 + \text{LUT}_{refineU}[Y_{coloc}]*(U-2^{Bchr-1})))$$

$$V_{refine} = \text{Max}(0, 2^{Bchr}-1, \text{Min}(2^{Bchr}-1 + \text{LUT}_{refineV}[Y_{coloc}]*(V-2^{Bchr-1})))$$

where $Y_{coloc}$ is the co-located inverse mapped luma sample

The look-up-tables $\text{LUT}_{refineY}$, $\text{LUT}_{refineU}$, $\text{LUT}_{refineV}$ can be built from piece-wise linear (PWL) tables, that can be signaled per slice. The pivot points of PWL tables can be equi-distant, and the tables size is for example equal to $2^S+1$, S being a parameter signaled in the slice header. In practice, a size of 17 can be used. When a table is not signaled for a component, the table previously decoded is used. In an embodiment, the tables can be sent only for slices of temporal level 0.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding video data based on a prediction loop based encoding process comprising:
  applying a mapping to a picture part using a mapping function to obtain a mapped picture part;

encoding the mapped picture part based on a reference picture to provide an encoded picture part;

reconstructing and in-loop filtering in the prediction loop the encoded picture part to provide a filtered reconstructed picture part;

applying an inverse of the mapping function to the filtered reconstructed picture part to obtain an inverse mapped filtered reconstructed picture part;

determining a refinement based on the inverse mapped filtered reconstructed picture part;

encoding data representing the refinement in the form of parameters representative of a piece wise linear model to provide encoded refinement data; and providing video data including the encoded picture part and the encoded refinement data.

2. The method of claim 1, wherein the refinement is determined out of the prediction loop.

3. The method of claim 1, wherein the refinement is determined in the prediction loop and applied to the filtered reconstructed picture part before storing the reference picture in a decoded picture buffer.

4. The method of claim 1, wherein the refinement is determined such that a rate distortion cost computed as a weighted sum of data coding rate of the refinement data and of the encoded picture part and of a distortion between an original version of the picture part and the inverse mapped filtered reconstructed picture part after refinement by the refinement data is decreased compared to a rate distortion cost computed as a weighted sum of data coding rate and of a distortion between the original version of the picture part and the inverse mapped filtered reconstructed picture part without refinement in the case where mapping applies before coding and the refinement is out of the prediction loop.

5. The method of claim 1, wherein the refinement is determined based on a first component of the inverse mapped filtered reconstructed picture part and applied to a second component of the inverse mapped filtered reconstructed picture part.

6. The method of claim 1, wherein the refinement is determined such that a rate distortion cost computed as a weighted sum of data coding rate of the refinement data and of the encoded picture part and of a distortion between the mapped picture part and the filtered reconstructed picture part after refinement by the refinement data is decreased compared to a rate distortion cost computed as a weighted sum of data coding cost and of a distortion between the mapped picture part and the filtered reconstructed picture part without refinement in the case where mapping applies before coding and the refinement is in the decoding loop.

7. An apparatus comprising:
one or more processors configured to encode video data based on a prediction loop based encoding process comprising:
applying a mapping to a picture part using a mapping function to obtain a mapped picture part;
encoding the mapped picture part based on a reference picture to provide an encoded picture part;
reconstructing and in-loop filtering in the prediction loop the encoded picture part to provide a filtered reconstructed picture part;
applying an inverse of the mapping function to the filtered reconstructed picture part to obtain an inverse mapped filtered reconstructed picture part;
determining a refinement based on the inverse mapped filtered reconstructed picture part;
encoding data representing the refinement in the form of parameters representative of a piece wise linear model to provide encoded refinement data; and
providing video data including the encoded picture part and the encoded refinement data.

8. The apparatus of claim 7, wherein the refinement is determined out of the prediction loop.

9. The apparatus of claim 7, wherein the refinement is determined in the prediction loop and applied to the filtered reconstructed picture part before storing the reference picture in a decoded picture buffer.

10. The apparatus of claim 7, wherein the refinement is determined based on a first component of the inverse mapped filtered reconstructed picture part and applied to a second component of the inverse mapped filtered reconstructed picture part.

11. A method for decoding video data based on a prediction loop based decoding process comprising:
decoding video data to obtain a picture part and refinement data in the form of parameters representative of a piece wise linear model;
in-loop filtering the picture part in the prediction loop to provide a filtered picture part;
applying an inverse mapping using an inverse mapping function to the filtered picture part to obtain an inverse mapped filtered picture part;
determining a refinement based on the inverse mapped filtered picture part and on the refinement data;
applying the refinement to the filtered picture part to provide a refined picture part; and
applying the inverse mapping to the refined picture part.

12. The method of claim 11, wherein the refinement is applied out of the prediction loop.

13. The method of claim 11, wherein the refinement is applied in the prediction loop to the filtered picture part before storing a reference picture comprising the refined picture part in a decoded picture buffer.

14. The method of claim 11, wherein the refinement is obtained for a first component of the inverse mapped filtered picture part and applied to a second component of the inverse mapped filtered picture part.

15. An apparatus comprising:
one or more processors configured to decode video data based on a prediction loop based decoding process comprising:
decoding video data to obtain a picture part and refinement data in the form of parameters representative of a piece wise linear model;
in-loop filtering the picture part in the prediction loop to provide a filtered picture part;
applying an inverse mapping using an inverse mapping function to the filtered picture part to obtain an inverse mapped filtered picture part;
determining a refinement based on the inverse mapped filtered picture part and on the refinement data;
applying the refinement to the filtered picture part to provide a refined picture part; and
applying the inverse mapping to the refined picture part.

16. The apparatus of claim 15, wherein the refinement is applied out of the prediction loop.

17. The apparatus of claim 15, wherein the refinement is applied in the prediction loop to the filtered picture part before storing a reference picture comprising the refined picture part in a decoded picture buffer.

18. The apparatus of claim 15, wherein the refinement is obtained for a first component of the inverse mapped filtered picture part and applied to a second component of the inverse mapped filtered picture part.

* * * * *